United States Patent
Lee et al.

(10) Patent No.: US 10,636,028 B2
(45) Date of Patent: Apr. 28, 2020

(54) ELECTRONIC DEVICE INCLUDING COIL

(71) Applicant: Samsung Electronics Co., Ltd., Gyeonggi-do (KR)

(72) Inventors: Hee-Dong Lee, Gyeongsangbuk-do (KR); Chul-Hyung Yang, Gyeongsangbuk-do (KR); Ji-Woo Lee, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/600,059

(22) Filed: Oct. 11, 2019

(65) Prior Publication Data

US 2020/0058015 A1    Feb. 20, 2020

Related U.S. Application Data

(63) Continuation of application No. 15/416,861, filed on Jan. 26, 2017.

(30) Foreign Application Priority Data

Feb. 4, 2016    (KR) ........................ 10-2016-0014440

(51) Int. Cl.
*G06Q 20/32*    (2012.01)
*G06Q 20/34*    (2012.01)
(Continued)

(52) U.S. Cl.
CPC ....... *G06Q 20/3278* (2013.01); *G06Q 20/204* (2013.01); *G06Q 20/352* (2013.01); *H04B 5/0081* (2013.01)

(58) Field of Classification Search
CPC ............. G06Q 20/3278; G06Q 20/352; G06Q 20/204; H04B 5/0081
See application file for complete search history.

(56) References Cited

U.S. PATENT DOCUMENTS 8,631,328 B2 * 1/2014 Kim ........................ G06F 3/017
                                                    715/706
8,793,519 B2 * 7/2014 Hong ..................... G06F 1/1626
                                                    323/318
(Continued)

FOREIGN PATENT DOCUMENTS

CN      104184217       12/2014
KR    1020140011069      1/2014
(Continued)

OTHER PUBLICATIONS

Chinese Office Action dated Oct. 28, 2019 issued in counterpart application No. 201680025806.3, 18 pages.

*Primary Examiner* — Ashford S Hayles
(74) *Attorney, Agent, or Firm* — The Farrell Law Firm, P.C.

(57) ABSTRACT

An electronic device is provided. The electronic device includes a housing; a plurality of coils that are disposed on a first layer within the housing; a plurality of other coils disposed on a second layer substantially parallel to the first layer; a first conductor that connects an end point of a first coil of the plurality of coils and a start point of a second coil of the plurality of other coils and conducts a current from the end point of the first coil to the start point of the second coil; and a second conductor that connects a start point of a third coil adjacent to an outer side of the first coil of the plurality of coils and an end point of the second coil and conducts the current to be applied from the end point of the second coil to the start point of the third coil, wherein the first conductor and the second conductor induce a directional magnetic field when the current flows.

25 Claims, 41 Drawing Sheets

(51) Int. Cl.
  *G06Q 20/20* (2012.01)
  *H04B 5/00* (2006.01)

(56) References Cited

U.S. PATENT DOCUMENTS

| | | | | |
|---|---|---|---|---|
| 8,849,195 B2* | 9/2014 | Orihara | H01Q 1/243 | 455/41.1 |
| 8,995,914 B2* | 3/2015 | Nishidai | H04B 5/00 | 340/426.16 |
| 9,559,548 B2* | 1/2017 | Kwon | H02J 5/005 | |
| 2004/0116074 A1* | 6/2004 | Fujii | G06K 7/0008 | 455/41.2 |
| 2008/0232506 A1* | 9/2008 | Fujita | G01S 13/931 | 375/295 |
| 2009/0122772 A1* | 5/2009 | Jung | H04L 63/102 | 370/338 |
| 2009/0212637 A1* | 8/2009 | Baarman | H01F 7/0247 | 307/104 |
| 2011/0279244 A1* | 11/2011 | Park | H02J 7/0052 | 340/10.34 |
| 2012/0202435 A1* | 8/2012 | Kim | H04B 5/0037 | 455/69 |
| 2012/0276953 A1* | 11/2012 | Kim | H04M 1/72527 | 455/556.1 |
| 2013/0076298 A1* | 3/2013 | Miller | H02J 7/0027 | 320/103 |
| 2013/0076653 A1* | 3/2013 | Selim | G06F 1/1692 | 345/173 |
| 2013/0094598 A1* | 4/2013 | Bastami | H02J 5/005 | 375/259 |
| 2013/0176653 A1* | 7/2013 | Kim | H02H 9/04 | 361/91.6 |
| 2013/0205142 A1* | 8/2013 | Jung | G06F 1/1677 | 713/300 |
| 2013/0231049 A1* | 9/2013 | Sharma | G06F 1/1632 | 455/41.2 |
| 2013/0252676 A1* | 9/2013 | Lee | H02J 50/80 | 455/573 |
| 2013/0270920 A1* | 10/2013 | Yoon | H04B 5/0037 | 307/104 |
| 2014/0049886 A1* | 2/2014 | Lee | H02J 4/00 | 361/679.01 |
| 2014/0120832 A1* | 5/2014 | Confer | H04B 5/0031 | 455/41.1 |
| 2014/0152119 A1* | 6/2014 | Endo | H02J 50/50 | 307/104 |
| 2014/0191568 A1* | 7/2014 | Partovi | H02J 7/025 | 307/9.1 |
| 2014/0274215 A1* | 9/2014 | Del Toro | G06F 1/1628 | 455/566 |
| 2015/0087228 A1* | 3/2015 | Porat | H04B 5/02 | 455/41.1 |
| 2015/0115725 A1* | 4/2015 | Kang | H01F 38/14 | 307/104 |
| 2015/0118965 A1* | 4/2015 | Butler | G06K 19/0701 | 455/41.1 |
| 2015/0155903 A1* | 6/2015 | Jang | H04B 1/3888 | 455/575.8 |
| 2015/0180525 A1* | 6/2015 | Chen | H04B 5/0037 | 455/575.8 |
| 2015/0207913 A1* | 7/2015 | Nakano | H01Q 7/00 | 455/41.1 |
| 2015/0245384 A1* | 8/2015 | Nambord | H04W 74/085 | 455/41.1 |
| 2015/0280790 A1* | 10/2015 | Onizuka | H02J 7/0044 | 320/108 |
| 2015/0288421 A1* | 10/2015 | Nambord | G06F 1/1632 | 455/41.1 |
| 2015/0362955 A1* | 12/2015 | Hayashi | G06F 1/1677 | 360/6 |
| 2015/0364944 A1* | 12/2015 | Garcia Briz | H02J 5/005 | 307/104 |
| 2016/0141899 A1* | 5/2016 | Oo | H02J 7/0044 | 320/108 |
| 2016/0149597 A1* | 5/2016 | Takasu | G06F 1/1669 | 455/127.2 |
| 2016/0233711 A1* | 8/2016 | Miller | H02J 7/0054 | |
| 2016/0241087 A1* | 8/2016 | Bae | H02J 7/025 | |
| 2016/0247144 A1* | 8/2016 | Oh | G06Q 20/3278 | |
| 2016/0261026 A1 | 9/2016 | Han et al. | | |
| 2016/0301785 A1* | 10/2016 | Espinoza | H04B 1/3888 | |
| 2017/0126267 A1* | 5/2017 | Park | H04B 1/3888 | |
| 2017/0228038 A1* | 8/2017 | Tangen | H02J 50/10 | |
| 2017/0295456 A1* | 10/2017 | Tanabe | H02J 50/80 | |
| 2018/0183267 A1* | 6/2018 | Lin | H02J 50/12 | |
| 2018/0323828 A1* | 11/2018 | Hwang | H02J 50/12 | |

FOREIGN PATENT DOCUMENTS

| | | |
|---|---|---|
| KR | 1020140061131 | 5/2014 |
| KR | 1020150025591 | 3/2015 |
| KR | 10-1584555 | 1/2016 |
| WO | WO 2009/142114 | 11/2009 |

* cited by examiner

[c] Case#1 Success Area Extraction (Z: 3cm)

[d] Case#2 Success Area Extraction (Z: 3cm)

| FPCB | Coveray | PI | 5 |
|---|---|---|---|
| | | Adhesive | 5 |
| | Plating | Cu-plating | 10 |
| | Base | Cu | 35 |
| | | PI | 12.5 |
| | | Cu | 35 |
| | Plating | Cu-plating | 10 |
| | Coveray | Adhesive | 5 |
| | | PI | 5 |

PI: Polymide Film, unit: mm

FIG.24A

| FPCB | Coveray | PI | 5 |
|---|---|---|---|
| | | Adhesive | 5 |
| | Plating | Cu-plating | 10 |
| | Base | Cu | 18 |
| | | PI | 12.5 |
| | | Cu | 35 |
| | Bond_s | Adhesive | 13 |
| | Base | PI | 12.5 |
| | | Cu | 18 |
| | Plating | Cu-plating | 10 |
| | Coveray | Adhesive | 5 |
| | | PI | 5 |

PI: Polymide Film, unit: mm

FIG.24B

ELECTRONIC DEVICE INCLUDING COIL

PRIORITY

This application is a Continuation of U.S. Ser. No. 15/416,861, which was filed in the U.S. Patent and Trademark Office on Jan. 26, 2017, and claims priority under 35 U.S.C. § 119(a) to Korean Patent Application Serial No. 10-2016-0014440, which was filed in the Korean Intellectual Property Office on Feb. 4, 2016, the entire content of each of which is incorporated herein by reference.

BACKGROUND

1. Field of the Disclosure

The present disclosure relates to an electronic device including a coil and, more particularly, to an electronic device including a coil capable of discharging a magnetic field when a current is applied.

2. Description of the Related Art

These days, electronic devices including a coil that induces a magnetic field have rapidly increased. For example, the electronic device may perform magnetic secure transmission (MST). The electronic device may apply a current to an embedded coil and the coil may induce an induced magnetic field based on the current applied to the coil. In this case, the electronic device may control the current applied to the coil and the induced magnetic field induced from the coil may vary depending on the controlled current. In addition, a conventional point of sale (POS) terminal for payment of a magnetic credit card may acquire payment information by detecting the change in the magnetic field through swiping of the magnetic credit card. Accordingly, if the electronic device can generate the same magnetic field change as the magnetic field change by the swiping of the magnetic credit card, the electronic device can perform the payment of the magnetic credit card. The conventional electronic device may generate an MST signal according to magnetic credit card information and apply a current corresponding to the generated MST signal to the coil. The coil may induce the changed magnetic field corresponding to the swiping of the magnetic credit card according to the applied current.

Also, the electronic device may perform wireless charging by using the embedded coil. The coil embedded into the electronic device may generate an induced current based on the magnetic field input from the outside and, accordingly, perform the wireless charging. Alternatively, the electronic device may apply the current to the coil and thus wirelessly charge another electronic device by discharging the induced magnetic field.

As described above, the conventional electronic device may include the coil for performing various operations such as the MST or the wireless charging.

For good performance of MST or wireless charging, an electronic device should form a sufficiently large induced magnetic field. When the electronic device forms a relatively small induced magnetic field, an induced current induced by the electronic device in a receiving side also becomes small, so that a charging speed may decrease or good delivery of an MST signal may be difficult.

For the good performance of the MST or wireless charging, a coil included in the electronic device should have sufficient inductance. Magnetic flux by the coil may be a product of the inductance and the current applied to the coil. Accordingly, as the inductance of the coil is larger, a relatively larger induced magnetic field may be formed for the same current. That is, in order to form a sufficiently large magnetic field, the electronic device should include a coil having relatively high inductance. In addition, the inductance of the coil may be associated with the number of turns of the coil and a strength of the magnetic field induced by the coil may be also proportional to the number of turns of the coil. However, a small electronic device which can be carried has a difficulty in unlimitedly increasing the number of turns of the coil.

Accordingly, it is required to develop a coil structure having relatively high inductance in the limited area.

SUMMARY

According to various aspects of the present disclosure, an electronic device including coils of a plurality of layers having relatively high inductance even in a limited mounting area may be provided. Particularly, the electronic device may include conductors that connect coils disposed on different layers and the conductors induce magnetic fields, so that a total strength of the magnetic fields induced from the electronic device may increase. In particular, a direction of the magnetic field induced from the coils may be different from a direction of the magnetic field induced from the conductor and, accordingly, the electronic device may induce magnetic fields in various directions and thus have the high degree of freedom in a disposition.

In accordance with an aspect of the present disclosure, an electronic device is provided. The electronic device includes.

In accordance with another aspect of the present disclosure, an electronic device is provided. The electronic device includes.

In accordance with another aspect of the present disclosure, an electronic device is provided. The electronic device includes a cover forming at least a portion of a first face of the electronic device; a display disposed on a second face of the electronic device opposite to the first face; a touch panel coupled to the display; a battery disposed between the display and the cover; a printed circuit board (PCB) disposed between the display and the cover; a flexible printed circuit board (FPCB) having at least two layers, wherein at least a portion of the flexible printed circuit board is disposed between at least a portion of the battery and the cover, and at least another portion of the flexible printed circuit board is disposed between at least a portion of the printed circuit board and the cover; and a processor electrically coupled to the flexible printed circuit board. The flexible printed circuit board comprises a first coil comprising a plurality of turns and supporting a near field communication (NFC); a second coil including a plurality of turns forming a loop surrounding the first coil, and supporting a transmission mode different from the near field communication; and a first supply wiring electrically connected to the second coil and the processor. The second coil includes a first portion disposed on a first layer of the flexible printed circuit board, and a second portion disposed on a second layer of the flexible printed circuit board and electrically connected to the first portion through a first plurality of via holes passing through an insulating layer disposed between the first layer and the second layer. The first supply wiring is disposed on the second layer of the flexible printed circuit board, is electrically connected to the first portion at inside of the loop through a second plurality of via holes, and, is extend from the inside of the loop to outside. The processor is configured to supply, by using the first supply wiring, a current to the second coil, and transmit, by using the second coil, a magnetic signal corresponding to a payment data, to outside the electronic device.

BRIEF DESCRIPTION OF THE DRAWINGS

The above and other aspects, features, and advantages of the present disclosure will be more apparent from the following detailed description, taken in conjunction with the accompanying drawings, in which:

FIGS. 24A and 24B illustrate laminated structures of FPCBs on which coils in a two layered structure and coils in a three layered structure are disposed according to various embodiments of the present disclosure.

DETAILED DESCRIPTION OF EMBODIMENTS OF THE PRESENT DISCLOSURE

Figure 1:
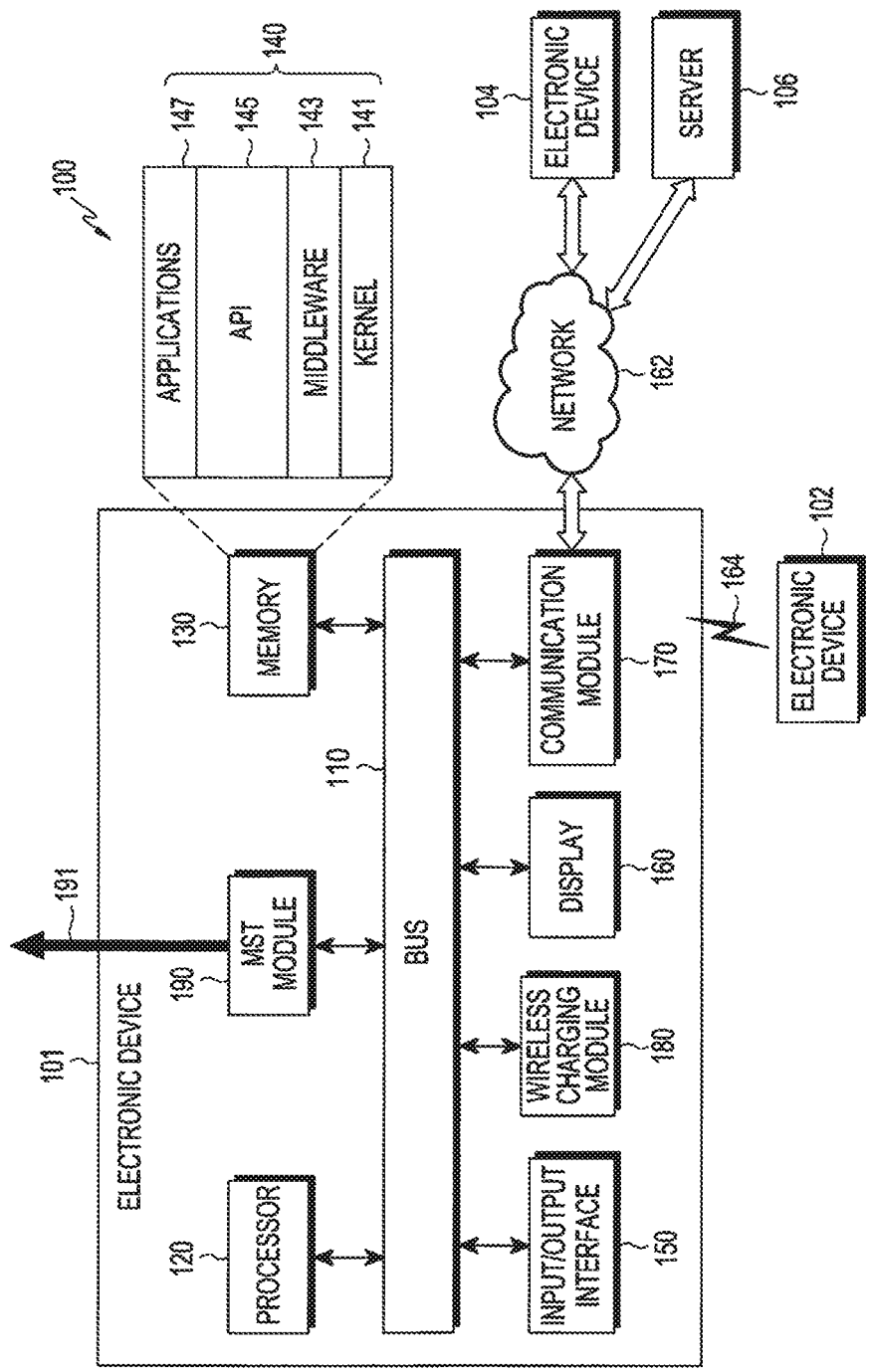
FIG. 1 is a block diagram of an electronic device and a network according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expressions "have", "may have", "include", or "may include" refer to the existence of a corresponding feature (e.g., numeral, function, operation, or constituent element such as component), and do not exclude one or more additional features.

In the present disclosure, the expressions "A or B", "at least one of A or/and B", or "one or more of A or/and B" may include all possible combinations of the items listed. For example, the expressions "A or B", "at least one of A and B", or "at least one of A or B" refer to all of (1) including at least one A, (2) including at least one B, or (3) including all of at least one A and at least one B.

The expressions "a first", "a second", "the first", or "the second" used in various embodiments of the present disclosure may modify various components regardless of the order and/or the importance but do not limit the corresponding components. For example, a first user device and a second user device indicate different user devices although both of them are user devices. For example, a first element may be referred to as a second element, and similarly, a second element may be referred to as a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may indicate a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein have the same meaning as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even terms defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture experts group (MPEG-1) audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head mounted device (HMD)), a fabric or clothing integrated type (e.g., an electronic clothing), a body-mounted type (e.g., a skin pad, or tattoo), and a bio-implantable type (e.g., an implantable circuit). In addition, the electronic device may wirelessly receive power from a wireless power transmitter and thus may be called a wireless power receiver.

According to some embodiments, the electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV™), a game console (e.g., Xbox® and PlayStation®), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automated teller machine (ATM) in banks, point of sale (POS) device in a shop, or Internet of Things (IoT) device (e.g., a lightbulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of new technology.

Hereinafter, an electronic device according to various embodiments will be described with reference to the accompanying drawings. In the present disclosure, the term "user" may indicate a person using an electronic device or a device (e.g. an artificial intelligence electronic device) using an electronic device.

FIG. 1 is a block diagram of an electronic device 101 within a network environment 100, according to various embodiments.

Referring to FIG. 1, the electronic device 101 may include a bus 110, a processor 120, a memory 130, an input/output interface 150, a display 160, a communication module 170, a wireless charging module 180, and an MST module 190. According to some embodiments, the electronic device 101 may omit at least one of the above elements or may further include other elements.

The bus 110 may include, for example, a circuit which interconnects the elements 110 to 190 and delivers communication (for example, a control message and/or data) between the elements 110 to 190.

The processor 120 may include one or more of a central processing unit (CPU), an application processor (AP), and a communication processor (CP). For example, the processor 120 may carry out operations or data processing relating to control and/or communication of at least one other element of the electronic device 101.

The memory 130 may include a volatile memory and/or a non-volatile memory. The memory 130 may store, for example, instructions or data related to at least one other element of the electronic device 101. According to an embodiment, the memory 130 may store software and/or a program 140. The program 140 may include a kernel 141, middleware 143, an application programming interface (API) 145, and/or application programs (or "applications")

147. At least some of the kernel 141, the middleware 143, and the API 145 may be referred to as an operating system (OS).

The kernel 141 may control or manage, for example, system resources (for example, the bus 110, the processor 120, and the memory 130) which are used to execute an operation or a function implemented in the other programs (for example, the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143 may serve, for example, as an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (for example, the bus 110, the processor 120, the memory 130, or like) of the electronic device 101 to at least one of the application programs 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include, for example, at least one interface or function (for example, instruction) for file control, window control, image processing, or text control.

The input/output interface 150 may function as, for example, an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a liquid crystal display (LCD), a light emitting diode (LED) display, an organic light emitting diode (OLED) display, a microelectromechanical systems (MEMS) display, and an electronic paper display. The display 160 may display, for example, various types of contents (for example, text, images, videos, icons, or symbols) to the user. The display 160 may include a touch screen and receive, for example, a touch, gesture, proximity, or hovering input by using an electronic pen or the user's body part.

The communication module 170 may set, for example, communication between the electronic device 101 and a first external electronic device 102, a second external electronic device 104, or a server 106. For example, the communication module 170 may be connected to a network 162 through wireless or wired communication to communicate with the second external electronic device 104 or the server 106.

The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), and Global system for mobile communications (GSM), as a cellular communication protocol. In addition, the wireless communication may include, for example, short range communication 164. The short-range communication 164 may be performed by using at least one of, for example, Wi-Fi, Bluetooth, near field communication (NFC), and global navigation satellite system (GNSS). The GNSS may include at least one of, for example, a global positioning system (GPS), a global navigation satellite system (Glonass), a Beidou navigation satellite system (hereinafter "Beidou"), and a European global satellite based navigation system (Galileo), according to a use area, a bandwidth, or the like. "GPS" may be interchangeably used with the "GNSS". The wired communication may include at least one of, for example, a universal serial bus (USB), a high definition multimedia interface (HDMI), recommended standard 232 (RS-232), and a plain old telephone service (POTS). The network 162 may include at least one of a communication network such as a computer network (for example, a local area network (LAN) or a wide area network (WAN)), the Internet, and a telephone network.

The wireless charging module 180 may receive wireless power from a wireless power receiver or transmit wireless power to another electronic device. The wireless charging module 180 may receive or transmit wireless power based on an induction scheme or a resonance scheme. The wireless charging module 180 may include a coil for transmitting/receiving wireless power.

The MST module 190 may perform MST with another electronic device. The performance of the MST may mean formation of a magnetic field 191 that changes size according to time. For example, the MST module 190 may induce the magnetic field 191 that changes size according to time, and the change in size according to time may be equal to transmission of a signal including information. Another electronic device, for example, a POS terminal may receive a signal including information from the electronic device 101 by detecting the change in the size of the magnetic field 191 according to time. In addition, the MST module 190 may include a coil for discharging a magnetic field. The MST module 190 may receive a signal from another electronic device by detecting the change in the magnetic field received from the other electronic device according to time.

Each of the first and second external electronic apparatuses 102 and 104 may be of a type identical to or different from that of the electronic apparatus 101. According to an embodiment, the server 106 may include a group of one or more servers. According to various embodiments of the present disclosure, all or some of the operations performed in the electronic device 101 may be performed in another electronic device or a plurality of electronic devices 102 and 104, or the server 106. According to an embodiment, when the electronic device 101 has to perform some functions or services automatically or in response to a request, the electronic device 101 may make a request for performing at least some functions relating thereto to another electronic device 102 or 104 or the server 106 instead of performing the functions or services by itself or in addition. Another electronic device 102 or 104 or the server 106 may execute the requested functions or the additional functions, and may deliver a result of the execution to the electronic apparatus 101. The electronic device 101 may provide the received result as it is or additionally process the result and provide the requested functions or services. To achieve this, for example, cloud computing, distributed computing, or client-server computing technology may be used.

Figure 2:
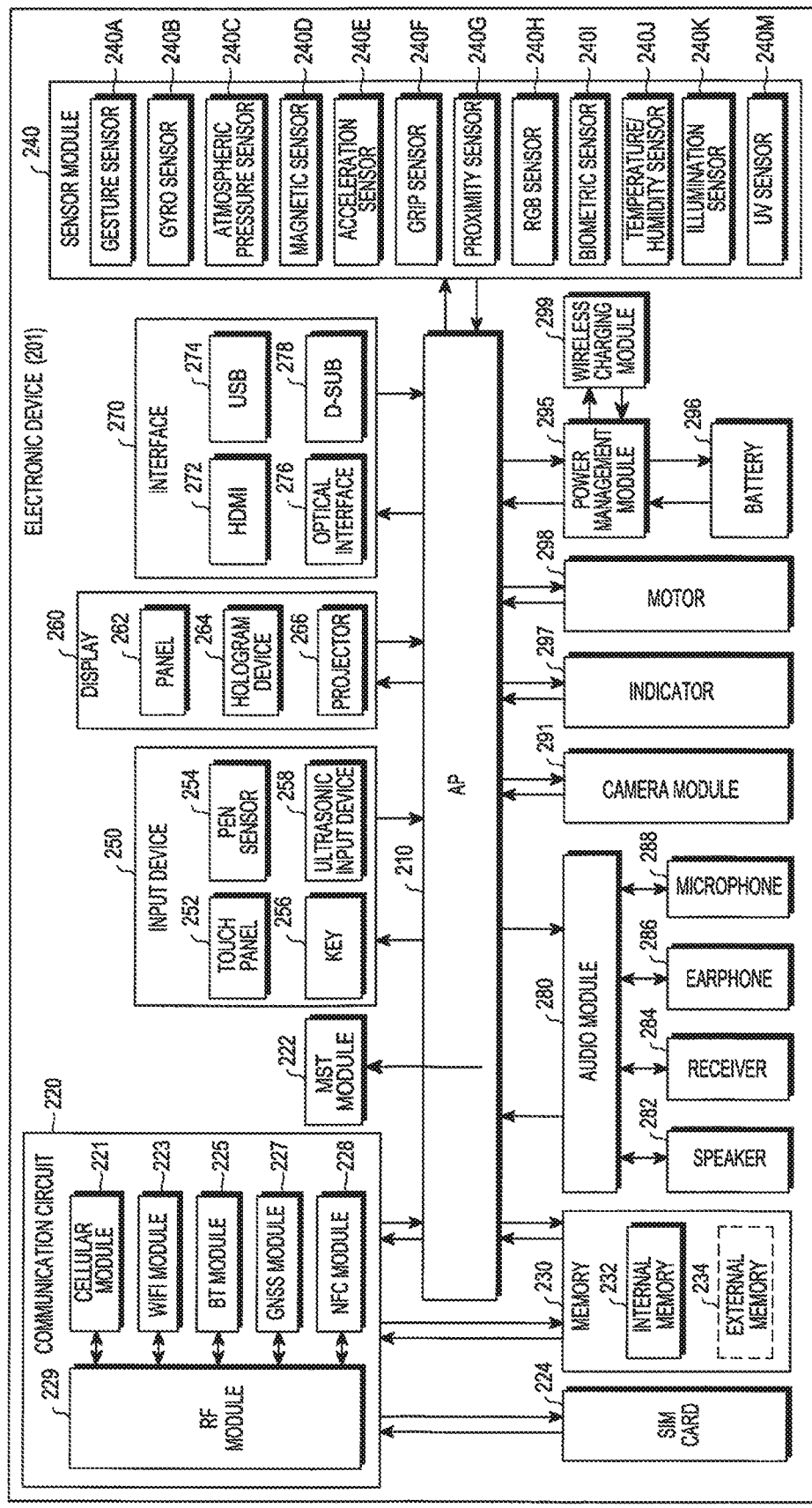
FIG. 2 is a block diagram of an electronic device according to various embodiments of the present disclosure.

FIG. 2 is a block diagram of an electronic device 201 according to various embodiments.

Referring to FIG. 2, the electronic device 201 may include, for example, all or some of the electronic device 101 illustrated in FIG. 1. The electronic device 201 may include one or more processors 210 (for example, an AP), a communication module 220, an MST module 222, a subscriber identification module 224, a memory 230, a sensor module 240, an input device 250, a display 260, an interface 270, an audio module 280, a camera module 291, a power management module 295, a battery 296, an indicator 297, a motor 298, and a wireless charging module 299.

The processor 210 may control a plurality of hardware or software elements connected to the processor 210 by driving an operating system or an application program and perform processing of various pieces of data and calculations. The processor 210 may be implemented by, for example, a system on chip (SoC). According to an embodiment, the processor 210 may further include a graphics processing unit (GPU) and/or an image signal processor. The processor 210 may also include at least some (for example, a cellular module 221) of the elements illustrated in FIG. 2. The processor 210 may load, into a volatile memory, instructions or data received from at least one (for example, a non-volatile memory) of the other elements and may process the loaded instructions or data, and may store various data in a non-volatile memory.

The communication module 220 may have a configuration equal or similar to that of the communication interface 170 of FIG. 1. The communication module 220 may include, for example, a cellular module 221, a Wi-Fi module 223, a Bluetooth (BT) module 225, a GNSS module 227 (for example, a GPS module, a Glonass module, a Beidou module, or a Galileo module), an NFC module 228, and a radio frequency (RF) module 229.

The cellular module 221 may provide a voice call, an image call, a text message service, or an Internet service through, for example, a communication network. According to an embodiment, the cellular module 221 may distinguish between and authenticate electronic devices 201 within a communication network using a subscriber identification module (SIM) card 224. The cellular module 221 may perform at least some of the functions that the processor 210 may provide. The cellular module 221 may include a CP.

The Wi-Fi module 223, the Bluetooth module 225, the GNSS module 227, or the NFC module 228 may include, for example, a processor that processes data transmitted and received through the corresponding module. According to some embodiments, at least some (two or more) of the cellular module 221, the Wi-Fi module 223, the BT module 225, the GNSS module 227, and the NFC module 228 may be included in one integrated circuit (IC) or IC package.

The RF module 229 may transmit/receive, for example, a communication signal (for example, an RF signal). The RF module 229 may include, for example, a transceiver, a power amplifier module (PAM), a frequency filter, a low noise amplifier (LNA), or an antenna. According to another embodiment of the present disclosure, at least one of the cellular module 221, the Wi-Fi module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (for example, an integrated circuit card identifier (ICCID)) or subscriber information (for example, an international mobile subscriber identity (IMSI)).

The MST module 222 may transmit/receive a signal using a magnetic field, for example, a signal including information such as payment information. The MST module 222 may induce the magnetic field that changes the size according to time and perform communication based on an induced current from the received magnetic field.

The memory 230 (for example, the memory 130) may include, for example, an internal memory 232 or an external memory 234. The internal memory 232 may include at least one of a volatile memory (for example, a dynamic random access memory (DRAM), a static RAM (SRAM), a synchronous DRAM (SDRAM), and the like) and a non-volatile memory (for example, a one-time programmable read only memory (OTPROM), a programmable ROM (PROM), an erasable PROM (EPROM), an electrically erasable PROM (EEPROM), a mask ROM, a flash ROM, a flash memory (for example, a NAND flash memory or a NOR flash memory), a hard disk drive, a solid state drive (SSD), and the like).

The external memory 234 may further include a flash drive, for example, a compact flash (CF), a secure digital (SD) device, a micro SD (Micro-SD) device, a mini SD (Mini-SD) device, an eXtreme digital (xD) device, a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and a ultraviolet (UV) light sensor 240M. Additionally or alternatively, the sensor module 240 may include, for example, an electronic nose (E-nose) sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. According to some embodiments, the electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, and an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic waves generated by an input tool through a microphone 288 and identify data corresponding to the detected ultrasonic waves.

The display 260 (for example, the display 160) may include a panel 262, a hologram device 264 or a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be implemented as one module. According to an embodiment, the panel 262 may include a pressure sensor (or a PUS sensor) which may measure a strength of pressure of a user's touch. The pressure sensor may be implemented integratedly with the touch panel 252 or implemented by one or more sensors separated from the touch panel 252. The hologram device 264 may show a three dimensional image in the air by using an interference of light. The projector 266 may display an image by projecting light onto a screen. The screen may be located, for example, inside or outside the electronic device 201. According to an embodiment, the display 260 may further include a control circuit for controlling the panel 262, the hologram device 264, or the projector 266.

The interface 270 may include, for example, a HDMI 272, a USB 274, an optical interface 276, or a D-subminiature (D-sub) connector 278. The interface 270 may be included in, for example, the communication interface 170 illustrated in FIG. 1. Additionally or alternatively, the interface 270 may include, for example, a mobile high definition link (MHL) interface, an SD card/multimedia card (MMC) interface, or an Infrared Data Association (IrDA) standard interface.

The audio module 280 may bilaterally convert, for example, a sound and an electrical signal. At least some elements of the audio module 280 may be included in, for example, the input/output interface 150 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. According to an embodiment, the camera module 291 may include one or more image sensors (for example, a front sensor or a back sensor), a lens, an image signal processor (ISP) or a flash (for example, LED or xenon lamp).

The power management module 295 may manage, for example, power of the electronic device 201. According to an embodiment, the power management module 295 may include a power management IC (PMIC), a charger IC, or a battery gauge. The PMIC may have a wired and/or wireless charging scheme. Examples of the wireless charging method may include, for example, a magnetic resonance method, a magnetic induction method, an electromagnetic wave method, and the like, and may further include additional circuits (for example, a coil loop, a resonance circuit, a rectifier, etc.) for wireless charging. The battery gauge may measure, for example, a residual quantity of the battery 296, and a voltage, a current, or a temperature during the charging. The battery 296 may include, for example, a rechargeable battery or a solar battery. The power management module 295 may be connected to the wireless charging module 299. The wireless charging module 299 may receive wireless power from another electronic device and charge the battery 296. Alternatively, the wireless charging module 299 may wirelessly charge another electronic device by using power from the battery 296. The wireless charging module 299 may be directly connected to the battery 296.

The indicator 297 may indicate a particular state (for example, a booting state, a message state, a charging state, or the like) of the electronic device 201 or a part (for example, the processor 210) of the electronic device 201. The motor 298 may convert an electrical signal into mechanical vibration, and may generate vibration, a haptic effect, or the like. Although not illustrated, the electronic device 201 may include a processing unit (for example, a GPU) for supporting a mobile television (TV). The processing unit for supporting mobile TV may, for example, process media data according to a certain standard such as digital multimedia broadcasting (DMB), digital video broadcasting (DVB), or mediaFlo™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
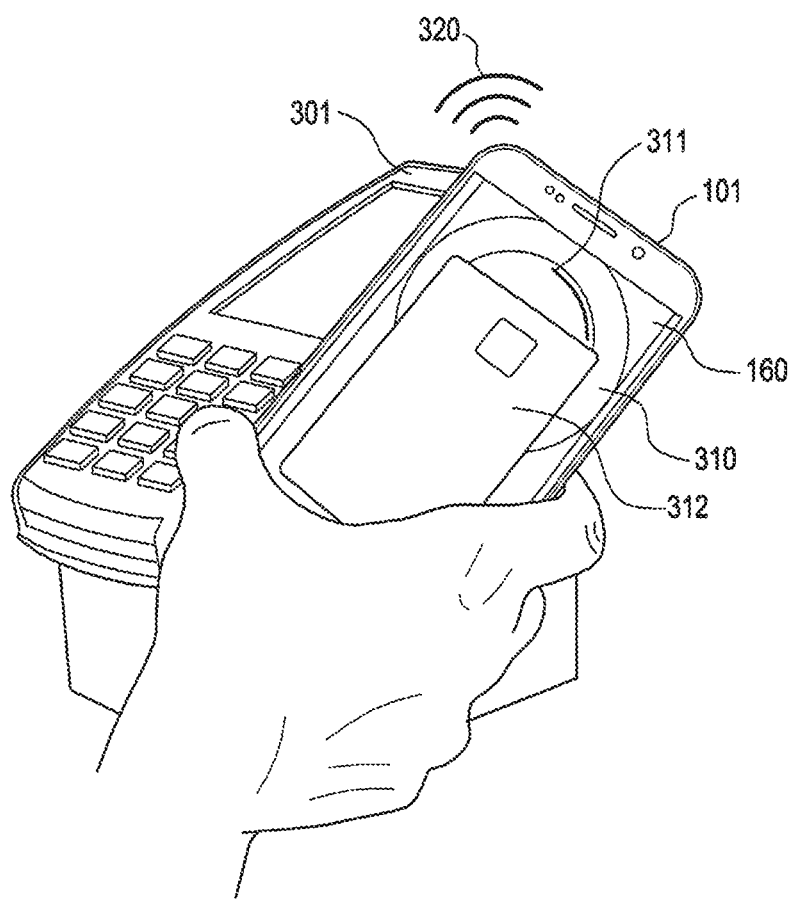
FIG. 3 is a diagram illustrating MST according to various embodiments of the present disclosure.

FIG. 3 is a diagram illustrating MST according to various embodiments of the present disclosure.

Referring to FIG. 3, a POS terminal 301 may be a device, which may acquire payment information from a magnetic credit card and transmit the acquired information to a payment server. For example, a reader header of the POS terminal 301 may sense a magnetic field when a magnetic recording medium such as a magnetic stripe of the credit card contacts the reader header. When the magnetic credit card is swiped through the reader header, the magnetic field sensed by the POS terminal 301 may be changed and the POS terminal 301 may acquire the changed magnetic field as payment information. That is, the POS terminal 301 may acquire the magnetic field changed according to time as the payment information.

The POS terminal 301 may transmit the payment information to the payment server, and the payment server may perform payment processing by using the received payment information. The POS terminal 301 may also transmit additional information (for example, payment amount) input from an input device to the payment server, and the payment server may determine whether to approve the payment based on the received payment information and the additional information. The payment server may transmit information on the approval of the payment or information on rejection of the payment to the POS terminal 301, and the POS terminal 301 may output the received information. That is, the POS terminal 301 may be a relay device for the payment information and the information on the payment approval or rejection, and receive a change in the ambient magnetic field as a signal.

In addition, the electronic device 101 according to various embodiments of the present disclosure may induce a magnetic field 320. The electronic device 101 may include coils of a plurality of layers according to various embodiments of the present disclosure, and induce the magnetic field 320 by applying the current to the coil. According to various embodiments of the present disclosure, the electronic device 101 may display a payment application execution screen 310 on the display 160. The payment application may include an image 312 related to a pre-registered credit card and an object 311 indicating that the payment is being performed. The electronic device 101 may change the magnetic field 320 according to time in accordance with the pre-registered credit card and, accordingly, a change pattern of the magnetic field 320 generated by the electronic device 101 may be the same as or correspond to a change pattern of the magnetic field by swiping of the credit card. That is, based on the fact that the magnetic field, which is changed according to the time, is formed, the discharging of the magnetic field from the electronic device 101 may have the same effect as the swiping of the credit card. Accordingly, the user may perform payment by using the electronic device 101 without a need to possess the credit card.

Figure 4:
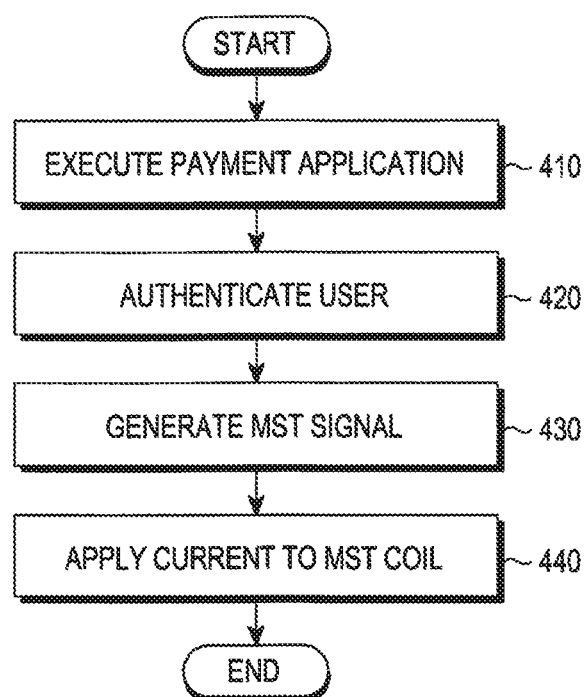
FIG. 4 is a flowchart illustrating an operation of the electronic device according to various embodiments of the present disclosure.

FIG. 4 is a flowchart illustrating an operation of the electronic device according to various embodiments of the present disclosure.

Referring to FIG. 4, in operation 410, the electronic device 101 may execute the payment application. The payment application has no limitation as long as the payment application is an application which can manage payment information related to the credit card and generate an MST signal. In operation 420, the electronic device 101 may perform user authentication. The electronic device 101 may output, for example, a graphic user interface which makes a request for inputting preset security information. The security information may be biometric information such as a user's fingerprint, voice, and iris or information on a password or pattern preset by the user, and has no limitation in the type. The electronic device 101 may receive the requested security information and compare the received security information with pre-stored security information, so as to perform user authentication.

In operation 430, the electronic device 101 may generate the MST signal. The MST signal may include payment information corresponding to the pre-registered credit card. In operation 440, the electronic device may apply the current corresponding to the MST signal to an MST coil. The MST coil may generate an induced magnetic field based on the applied current. The size of the induced magnetic field may be changed according to, for example, payment information corresponding to the credit card. The POS terminal may acquire payment information by sensing the induced magnetic field.

Figure 5:
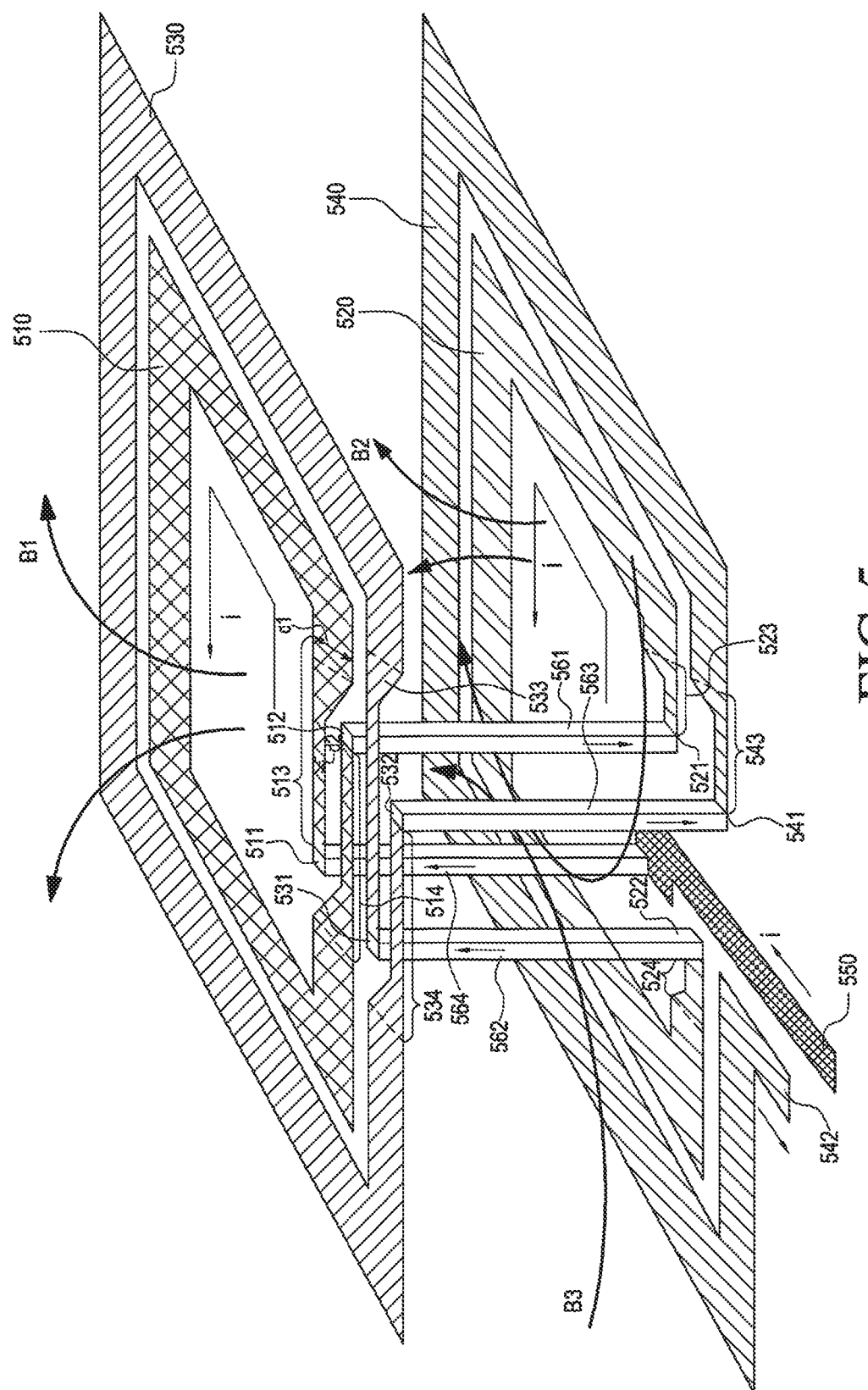
FIG. 5 is a diagram of a coil according to various embodiments of the present disclosure.

FIG. 5 is a diagram of the coil according to various embodiments of the present disclosure.

Referring to FIG. 5, a first coil 510 and a third coil 530 may be disposed on a first layer. The third coil 530 may be adjacent to the outer side of the first coil 510, which means that a next coil disposed on the outer side of the first coil 510 is the third coil 530. A winding radius of the third coil 530 may be larger than a winding radius of the first coil 510. That is, the first coil 510 may be disposed relatively on the inner side, and the third coil 530 may be disposed relatively on the outer side compared to the first coil 510. The inner side or the outer side may be determined according to a distance between the coil 510 or 530 and the center. As illustrated in FIG. 5, a distance between the center of the coil and the first coil 510 may be shorter than a distance between the center of the coil and the third coil 530 and, accordingly, it may be defined that the first coil 510 is disposed relatively inside compared to the third coil 530. In addition, two or more coils may be disposed on the first layer. That is, additional coils may be further disposed on the outer side of the third coil 530. That is, a plurality of coils (for example, the first coil 510 and the third coil 530) may be disposed on the first layer. The plurality of coils may perform one operation (for example, discharging the magnetic field for MST). The plurality of coils may be connected to each other through a conductor and a plurality of coils on a second layer. A plurality of additional coils for another operation (for example, wireless charging or NFC) may be further disposed on the first layer, which will be described below in more detail. In this case, the plurality of coils and the plurality of additional coils may not be directly connected to each other.

The first coil 510 may include a conductor connected from a start point 511 to an end point 512, and the conductor may have a winding form. Although it is illustrated that the conductor included in the first coil 510 has the winding form bent at a right angle in an embodiment of FIG. 5, this is only an example, and the first coil 510 has no limitation if the coil is a conductor which can induce an induced magnetic field in a particular direction. The start point 511 of the first coil 510 may be formed substantially more inwardly than the end point 512 of the first coil 510. The inner side may refer to a side relatively closer to the center of the first coil 510. A current i may be applied to the first coil 510, and the first coil 510 may induce the induced magnetic field according to the applied current i. In addition, the current i of the same direction as that of the first coil 510 may be applied to the third coil 530, and the third coil 530 may also induce the induced magnetic field. The magnetic field induced from the first coil 510 and the third coil 530 may be named a first magnetic field B1.

The first coil 510 may have a closed loop form. More specifically, a second connection part 514 connected with the end point 512 of the first coil 510 may have a form extended to the right side as viewed from the top. The second connection part 514 may extend to the right side while passing through an x direction coordinate of the start point 511 of the first coil 510 and, accordingly, the start point 511 of the first coil 510 may be isolated from the outside by the second connection part 514. As described above, the form in which the start point of the coil is closed from the outside by the connection part connected to the end point may be named the closed loop form. That is, in the closed loop form, an x axis coordinate of the end point 512 of the first coil 510 may be disposed on the right side of an x axis coordinate of the start point 511 of the first coil 510. In addition, a first connection part 513 and the second connection part 514 of the first coil 510 may be parts for a connection with the conductor, that is, a via set, and the remaining parts except for the connection parts 513 and 514 may be parts for the winding. Accordingly, the remaining parts except for the connection parts of the coil may be named a winding pattern.

The first coil 510 may generally have a width of d1. In addition, the first connection part 513 connected to the start point 511 of the first coil 510 may generally have a width of d2 and, accordingly, some of the first connection part 513 may have a form in which a width is reduced from d1 to d2. As the width d2 of the first connection part 513 is narrower than the general width d1 of the first coil 510, it is possible to secure a space to dispose a plurality of conductors 561 to 564 and also reduce a total mounting areas of the coils 510 and 530 disposed on the first layer. For example, if the first connection part 513 has the width d1, a width of the corresponding part becomes larger than 2×d1 in consideration of separation between the first connection part 513 and the second connection part 514. However, since the first connection part 513 has a structure in which the width is reduced, a total coil width of the part where the first connection part 513 and the second connection part 514 are disposed may be about d1. More specifically, a sum of the first connection part 513 and the second connection part 514 may be smaller than d1. Accordingly, it is possible to prevent the mounting area of the coil in which the start point and the end point of the coil are located from being wide.

According to various embodiments of the present disclosure, the structure in which the width of the first connection part 513 becomes narrow and the structure in which the width of the second connection part 514 becomes narrow may correspond to each other. More specifically, the first connection part 513 may have the structure in which the width becomes narrower in an upper left direction as viewed from the top and the second connection part 514 may have the structure in which the width becomes narrower in a lower right direction as viewed from the top. That is, the first connection part 513 may have a form in which the width increases in a first side direction of the winding pattern from the start point 511, and the second connection part 514 may have a form in which the width increases in a second side direction of the winding pattern from the end point 512, which may be also applied to the remaining coils. Accordingly, the first connection part 513 and the second connection part 514 may be disposed together within the width d1. More specifically, a sum of the width d2 of the first connection part 513 and the width d2 of the second connection part 514 may be smaller than the width d1 of the winding pattern of the first coil 510.

The end point 512 of the first coil 510 may be connected to the first conductor 561. For example, the first conductor 561 may be formed in a direction substantially perpendicular to the first layer on which the first coil 510 is disposed. The first conductor 561 may be connected to a start point 521 of a second coil 520. That is, the first conductor 561 may connect the end point 512 of the first coil 510 and the start point 521 of the second coil 520 and apply the current i from the end point 512 of the first coil 510 to the start point 521 of the second coil 520. The first conductor 561 may extend in a direction substantially perpendicular to the first layer on which the first coil 510 is disposed and the second layer on which the second coil 520 is disposed. Another element may be disposed between the first layer and the second layer and, in this case, the first conductor 561 may connect the two coils 510 and 520 through an opening formed on the other element disposed therebetween. In this case, the first conductor 561 may be named a via set. According to various embodiments of the present disclosure, one conductor of FIG. 5 may be implemented by a plurality of separated conductors. That is, a plurality of separated conductors may connect the end point 512 of the first coil 510 and the start point 521 of the second coil 520 in a vertical direction. As a result, the number of conductors for connecting the end point of the coil on the first layer and the start point of the coil on the second layer may be one or more and, accordingly, the conductors may be named as the via set.

In addition, disposing on the first layer and the second layer may refer to disposing two PCBs or two flexible PCBs (FPCBs), respectively. Alternatively, the first coil 510 and the second coil 520 may be disposed on both surfaces of one PCB or FPCB, respectively. In this case, a structure in which the conductors, that is, the via set passes through one PCB or FPCB may appear. In this case, the first coil 510 may be disposed on the first layer and the second coil 520 may be disposed on the second layer. Alternatively, coils of two layers may be disposed on the inner side of the FPCB and a plating layer or a film for protecting the corresponding coil may be additionally included in the FPCB, which will be described below in more detail. Further, the first layer and the second layer may be substantially parallel to each other.

The second coil 520 may receive the current i through the first conductor 561. In this case, the current i may be applied in a direction from a start point 521 of the second coil 520 to an end point 522 of the second coil 520 and may be applied to the second conductor 562 connected to the end point 522. The second coil 520 may induce the induced magnetic field based on the applied current i. The induced magnetic field induced from the second coil 520 and a fourth coil 540 may be named as a second magnetic field B2.

The second coil 520 may include a conductor connected from the start point 521 to the end point 522, and the conductor may have a winding form from the start point 521 to the end point 522. The second coil 520 may include a third connection part 523 connected to the start point 521 and a fourth connection part 524 connected to the end point 522. General widths of the third connection part 523 and the fourth connection part 524 may be smaller than a general width of the second coil 520. Further, as described about the connection parts 513 and 514 of the first coil 510, some of the connection parts 523 and 524 may have a form in which the width is reduced from the general width of the second coil 520, that is, the width d1 of the winding pattern. The second coil 520 may have an opened loop form, which is an open type.

More specifically, the fourth connection part 524 connected with the end point 522 of the second coil 520 may have a form extended to the right side as viewed from the top. The fourth connection part 524 may extend without passing through an x direction coordinate of the start point 521 of the second coil 520 and, accordingly, the start point 521 of the second coil 520 may be isolated from the outside by the fourth connection part 524. That is, the x axis coordinate of the end point 522 of the second coil 520 may be located relatively on the left side of the x axis coordinate of the start point 521 of the second coil 520. As described above, the form in which the start point of the coil is not closed from the outside by the connection part connected to the end point may be named the opened loop form. In addition, as the second coil 520 has the opened loop form, another coil may be disposed on the inner side of the second coil 520 and an input/output pattern of the other coil may be disposed on an interval of the opened loop of the second coil 520, which will be described below in more detail.

In addition, the end point 522 of the second coil 520 may be connected to the second conductor 562. The second conductor 562 may be connected to a start point 531 of the third coil 530 disposed on the first layer. Accordingly, the end point 522 of the second coil 520 may be connected to the start point 531 of the third coil 530. As the current i is applied from the end point 522 of the second coil 520 to the start point 531 of the third coil 530, a direction of the current i applied to the second conductor 562 may be an up direction.

The third coil 530 may receive the current i through the second conductor 562. In this case, the current i may be applied in a direction from the start point 531 of the third coil 530 to an end point 532 of the third coil 530 and may be applied to the third conductor 563 connected to the end point 532. The third coil 530 may induce the induced magnetic field based on the applied current i.

The third coil 530 may include a conductor connected from the start point 531 to the end point 532, and the conductor may have a winding form from the start point 531 to the end point 532. The third coil 530 may include a fifth connection part 533 connected to the start point 531 and a sixth connection part 534 connected to the end point 532. General widths of the fifth connection part 533 and the sixth connection part 534 may be smaller than the general width of the third coil 530. Further, as described in relation to the connection parts 513 and 514 of the first coil 510, some of the connection parts 533 and 534 may have a form in which the width is reduced from the general width d1 of the third coil 530. The third coil 530 may have a closed loop form.

In addition, the end point 532 of the third coil 530 may be connected to the third conductor 563. The third conductor 563 may be connected to a start point 541 of the fourth coil 540 disposed on the second layer. Accordingly, the end point 532 of the third coil 530 may be connected to the start point 541 of the fourth coil 540. As the current i is applied from the end point 532 of the third coil 530 to the start point 541 of the fourth coil 540, a direction of the current i applied to the third conductor 563 may be a down direction.

The fourth coil 540 may receive the current i through the third conductor 563. In this case, the current i may be applied in a direction from the start point 541 of the fourth coil 540 to an end point 542 of the fourth coil 540 and may be applied to an output terminal connected to the end point 542. The fourth coil 540 may induce the induced magnetic field based on the applied current i.

The fourth coil 540 may include a conductor connected from the start point 541 to the end point 542, and the conductor may have a winding form from the start point 541 to the end point 542. The fourth coil 540 may include a seventh connection part 543 connected to the start point 541. A general width of the seventh connection part 543 may be smaller than the general width of the fourth coil 540, that is, the width of the winding pattern. Further, as described in relation to the connection parts 513 and 514 of the first coil 510, some of the connection part 543 may have a form in which the width is reduced from the general width d1 of the fourth coil 540. The fourth coil 540 may have an opened loop form.

In addition, an input pattern 550 may be disposed on the second layer. The input pattern 550 may be connected to the fourth conductor 564 and the fourth conductor 564 may be connected to the start point 511 of the first coil 510. The input pattern 550 may be connected to a means (for example, an MST communication module, a communication module, a battery, or a PMIC), which can provide the current, and, accordingly, the current i may be applied to the first coil 510 from the input pattern 550. A direction of the current i applied to the fourth conductor 564 may be an up direction.

As a result, an order of coils to which the current is applied or a coil connection order may be $C_{11}, C_{21}, C_{12}, C_{22}, C_{13}, C_{23}, \ldots$. In $C_{ij}$, i may denote a layer and j may denote an order of the disposition from the inner side. For example, $C_{21}$ may be a first coil from the inner side on the second layer, and $C_{32}$ may be a second coil from the inner side on the third layer.

According to the above described coil structure, the current i provided from the input pattern 550 may be applied to the first coil 510, the second coil 520, the third coil 530, and the fourth coil 540. Accordingly, the number of turns of the whole coil may increase and thus inductance of the coil may also increase. That is, four turns are possible in a mounting area in which two turns are possible, so that inductance of the coil may increase. As a result, the size of the magnetic field (B1+B2) induced by the coil may also increase. Further, a magnetic field B3 induced by the conductors 561 to 564 may be also formed and thus a strength of entire magnetic fields may increase. Particularly, as conductors having the same current direction are grouped and disposed, the magnetic field B3 induced by the conductors 561 to 564 may increase. In addition, a direction of a directional magnetic field induced by the conductor may be determined according to a disposition form (for example, a straight line) of conductors having the same current direction. Accordingly, the disposition form of the conductors having the same current direction may be determined in consideration of the direction of the directional magnetic field. More specifically, the conductors 562 and 564 to which the current in the up direction is applied may be disposed adjacent to each other, and the conductors 561 and 563 to which the current in the down direction are disposed adjacent to each other. Further, the direction of the magnetic field B3 induced by the conductors 561 to 564 may be different from the direction of the magnetic field (B1+B2) induced by the coils 510 to 540, so that the electronic device 101 may induce the magnetic fields in various directions. Accordingly, the degree of freedom for the disposition of the electronic device 101 may increase, which will be described below in more detail.

Figure 6A:
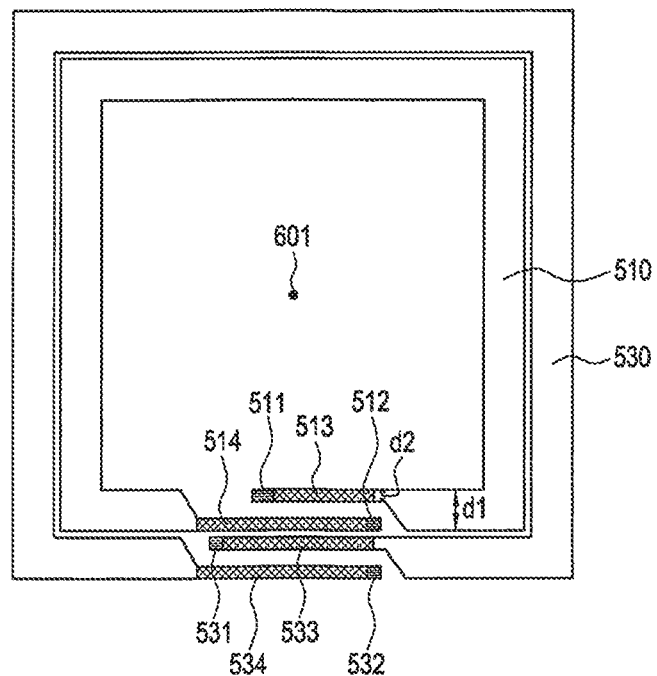
FIG. 6A is a plan view illustrating a coil disposed on a first board according to various embodiments of the present disclosure.
Figure 6B:
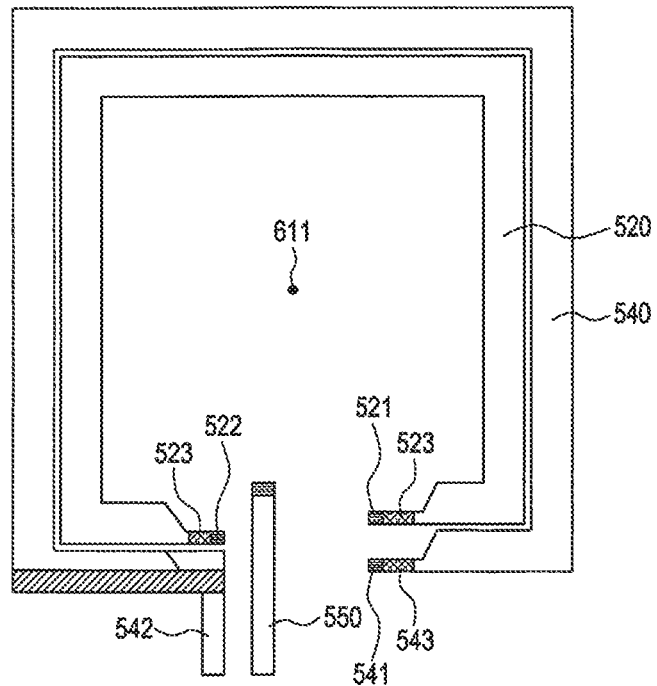
FIG. 6B is a plan view illustrating a coil disposed on a second board according to various embodiments of the present disclosure.
Figure 6C:
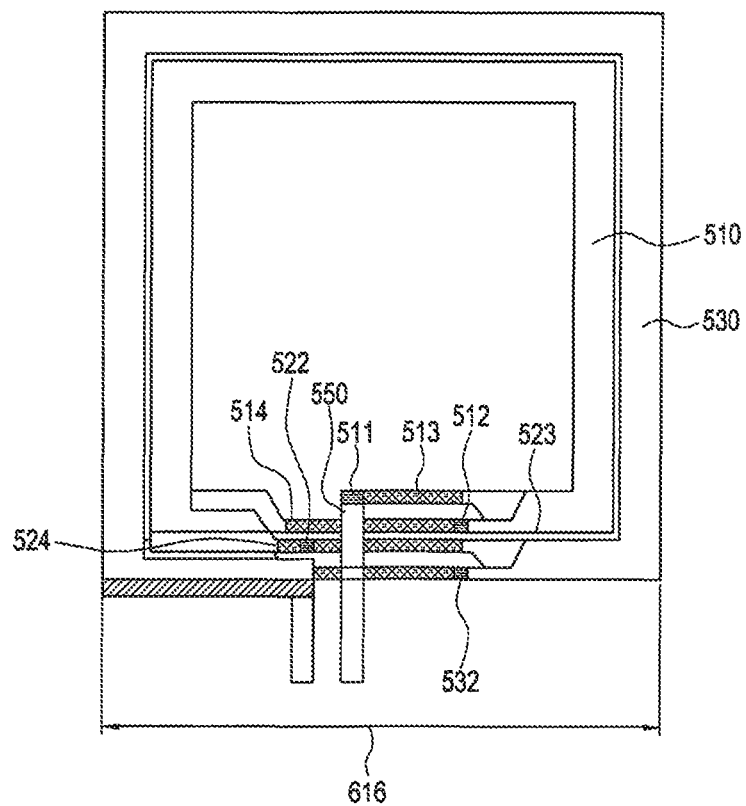
FIG. 6C is a plan view illustrating coils disposed on a first board and a second board while overlapping each other.

FIG. 6A is a plan view illustrating the coil disposed on the first layer according to various embodiments of the present disclosure. FIG. 6B is a plan view illustrating the coil disposed on the second layer according to various embodiments of the present disclosure. FIG. 6C is a plan view illustrating coils disposed on the first layer and the second layer while overlapping each other.

The first coil 510 and the third coil 530 may be disposed on the first layer. The third coil 530 may be adjacent to the outer side of the first coil 510. The first coil 510 and the third coil 530 may have the closed loop form. In addition, the second coil 520 and the fourth coil 540 may be disposed on the second layer. The fourth coil 540 may be adjacent to the outer side of the second coil 520. The second coil 520 and the fourth coil 540 may have the opened loop form. In addition, as illustrated in FIG. 6C, a part of the first coil 510 except for the first connection part 513 and the second connection part 514 and a part of the second coil 520 except for the third connection part 523 and the fourth connection part 524 may overlap each other. This indicates that a location of the part of the first coil 510 except for the first connection part 513 and the second connection part 514 and a location of the part of the second coil 520 except for the third connection part 523 and the fourth connection part 524, that is, locations of the winding patterns are substantially the same. In addition, the disposition of the coils described above is only an example, and the first coil 510 and the second coil 520 may be configured to not overlap each other. According to various embodiments of the present disclosure, most parts of the third coil 530 and the fourth coil 540 except for the connection parts, that is, the winding patterns may overlap each other.

The first connection part 513 of the first coil 510 and the second connection part 523 of the second coil 520 may not overlap each other. This is because the second connection part 514 of the first coil 510 should extend up to the start point 521 of the second coil 520 since the end point 512 of the first coil 510 should be connected to the start point 521 of the second coil 520. According to various embodiments of the present disclosure, the parts of the first coil 510 and the second coil 520 except for the connection parts, that is, the winding patterns may overlap each other, and the connection parts may not overlap.

In addition, as illustrated in FIG. 6C, the conductors 562 and 564 to which the current in the up direction is applied may be disposed adjacent to each other, and the conductors 561 and 563 to which the current in the down direction is applied are disposed adjacent to each other.

Figure 7:
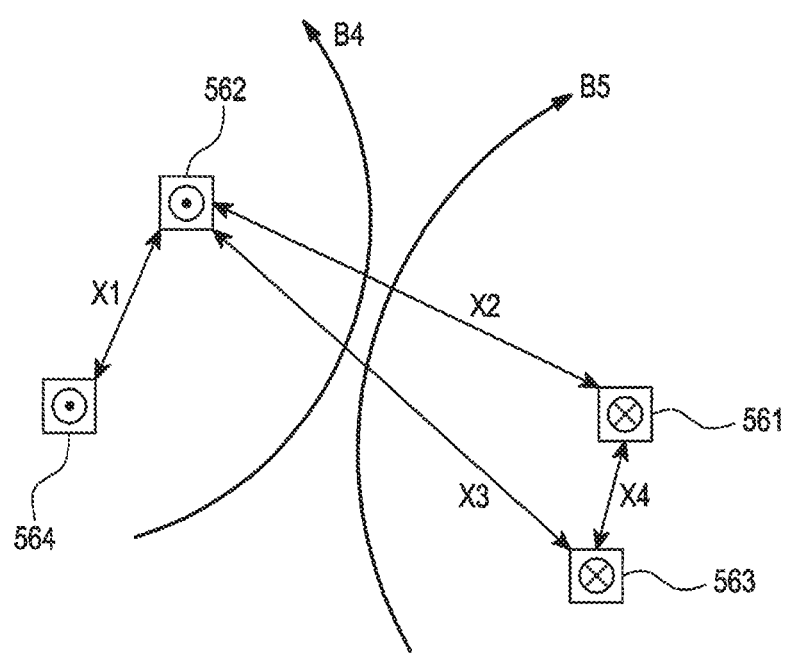
FIG. 7 is a plan view illustrating locations of conductors according to various embodiments of the present disclosure.

FIG. 7 is a plan view illustrating locations of the conductors according to various embodiments of the present disclosure.

Referring to FIG. 7, a distance X1 between the second conductor 562 and the fourth conductor 564 may be relatively smaller than a distance X2 between the second conductor 562 and the first conductor 561 or a distance X3 between the second conductor 562 and the third conductor 563. Further, a distance X4 between the first conductor 561 and the third conductor 563 may be relatively smaller than the distance X2 between the second conductor 562 and the first conductor 561 or the distance X3 between the second conductor 562 and the third conductor 563. That is, the pattern of the conductors 561 to 564 may be designed such that the conductors to which the current in the same direction is applied are adjacent to each other. Accordingly, a direction of an induced magnetic field B4 induced from the second conductor 562 and the fourth conductor 564 and a direction of an induced magnetic field B5 induced from the first conductor 561 and the third conductor 563 may be the same between the first conductor 561 and the second conductor 562. A vector sum of the induced magnetic fields B4 and B5 may be the third magnetic field B3 by the conductors 561 to 564 described in FIG. 5. The third magnetic field B3 by the conductors 561 to 564 may have directivity pointing to a particular direction different from that of a circular magnetic field formed by a general single conducting wire. In addition, in FIG. 7, a line generated by connecting the second conductor 562 and the fourth conductor 564 may have a first direction, and a line generated by connecting the first conductor 561 and the third conductor 563 may have a second direction. The first direction and the second direction may be the same as or different from each other. The direction of the third magnetic field B3 may be determined according to the first direction and the second direction. A manufacturer may determine the first direction and the second direction in consideration of a pattern in which the user places the electronic device near the POS terminal.

Figure 8A:
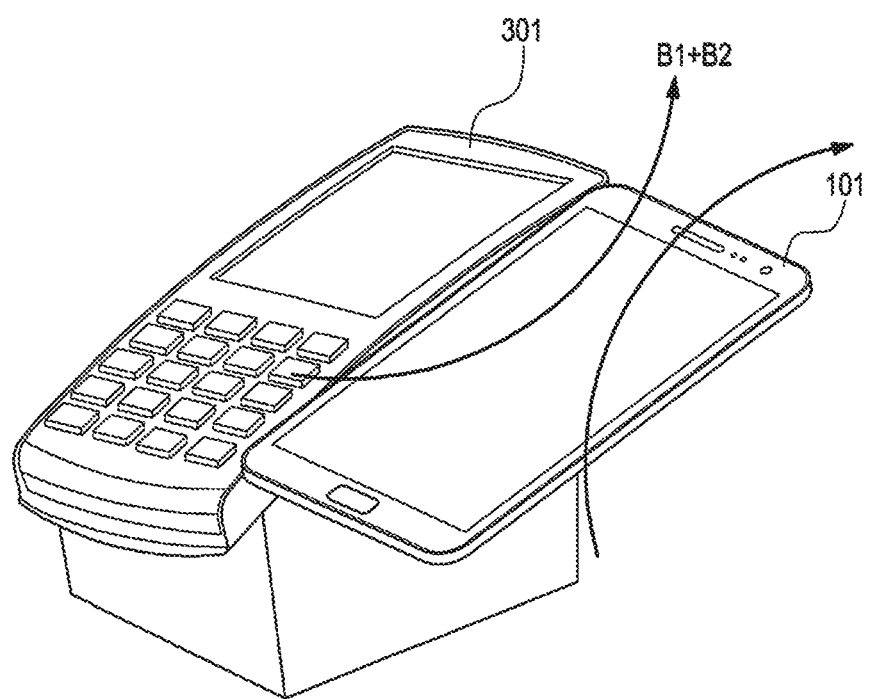
FIGS. 8A and 8B are diagrams illustrating an increase in the degree of freedom of the disposition of the electronic device according to various embodiments of the present disclosure.
Figure 8B:
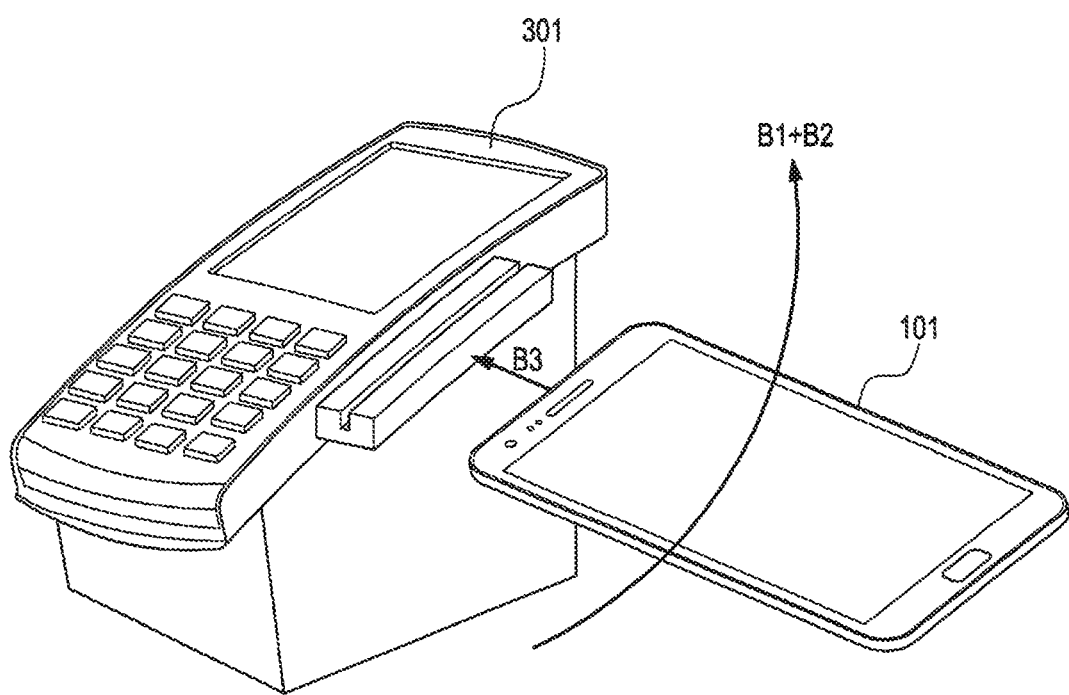

FIGS. 8A and 8B are diagrams illustrating an increase in the degree of freedom of the disposition of the electronic device according to various embodiments of the present disclosure.

Referring to FIG. 8A, the electronic device 101 may induce a magnetic field B1+B2 in a direction substantially perpendicular to the display. Accordingly, when the display of the electronic device 101 is relatively parallel to the POS terminal 301, the induced magnetic field B1+B2 may approach the POS terminal 301, so that transmission of an MST signal may be good. In addition, referring to FIG. 8B, the electronic device 101 may induce the magnetic field B3 in a direction substantially parallel to the display, and the magnetic field B3 may be induced by the current applied to the conductor, that is, the via set for the coil connection. Accordingly, when the display of the electronic device 101 is relatively perpendicular to the POS terminal 301, the induced magnetic field B3 may head for the POS terminal 301, so that good transmission of the MST signal can be secured. Therefore, the disposition of the electronic device 101 may be comparatively free of the POS terminal 301.

Figure 9A:
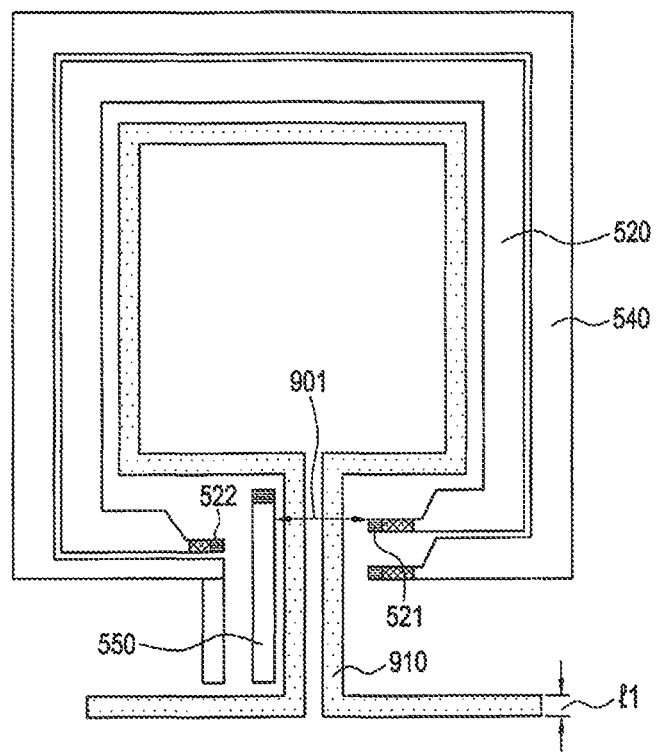
FIG. 9A is a plan view illustrating a coil disposed on a second board according to various embodiments of the present disclosure.

FIG. 9A is a plan view illustrating the coil disposed on the second layer according to various embodiments of the present disclosure.

As illustrated in FIG. 9A, the second coil 520 and the fourth coil 540, which have the opened loop form, may be disposed on the second layer. In addition, an input pattern 550 may be disposed on the second layer. As the second coil 520 has the opened loop form, the start point 521 of the second coil 520 and the end point 522 of the second coil 520 may have an interval therebetween. Further, the input pattern 550 and the second coil 520 may have an interval 901 therebetween. As the input pattern 550 and the second coil 520 have the interval 901 therebetween, an additional coil 910 may be further disposed on the second layer. For example, the additional coil 910 may have a width of 11 and the interval 901 may be two times the width 11 or larger. Accordingly, an input part and an output part, that is, an input/output pattern may be also disposed within the interval 901 such that the additional coil 910 is disposed within the second coil 520. The additional coil 910 may have the same purpose as or different purpose from that of the coils 510 to 540. For example, when the coils 510 to 540 are for MST, the additional coil 910 may also be a coil for MST to supplement a null area, which will be described below in more detail. Alternatively, the additional coil 910 may be a coil for wireless charging or another type communication (for example, NFC communication).

That is, as described above, as the coils disposed on at least one layer have the opened loop form, another additional coil may be disposed within the coil of the opened loop form.

Figure 9B:
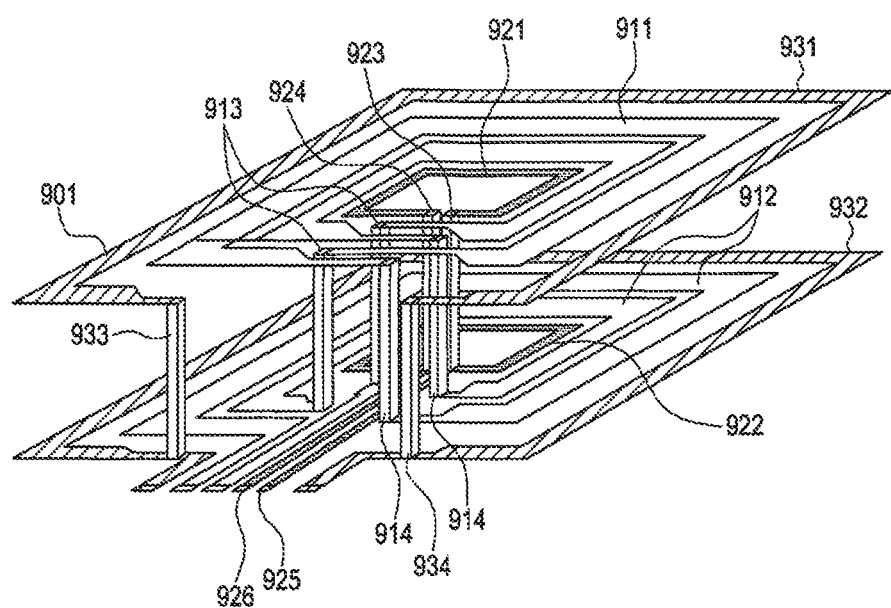
FIG. 9B is a perspective view illustrating a structure in which an additional coil is disposed according to various embodiments of the present disclosure.

FIG. 9B is a perspective view illustrating a structure in which the additional coil is disposed according to various embodiments of the present disclosure.

Referring to FIG. 9B, first additional coils 921 and 922 may be disposed on the inner side of other coils 911 and 912 according to an embodiment of the present disclosure. As described above, the coil 912 may have the opened loop form and, accordingly, input/output patterns 925 and 926 corresponding to the first additional coils 921 and 922 may be disposed on an interval according to the opened loop form of the coil 912. In addition, the first additional coils 921 and 922 may be connected in a vertical direction through conductors, that is, via sets 923 and 924. The coils 911 and 912 may be also connected in the vertical direction through via sets 913 and 914. In addition, second additional coils 931 and 932 may be disposed on the outer side of the coils 911 and 912, and may be connected in a vertical direction through via sets 933 and 934. Although FIG. 913 illustrates that sub coils are connected in parallel in the first additional coils 921 and 922 and the second additional coils 931 and 932, this is only an example, and the sub coils may be connected in series in the first additional coils 921 and 922 and the second additional coils 931 and 932 to have same the structure of FIG. 5.

Figure 10A:
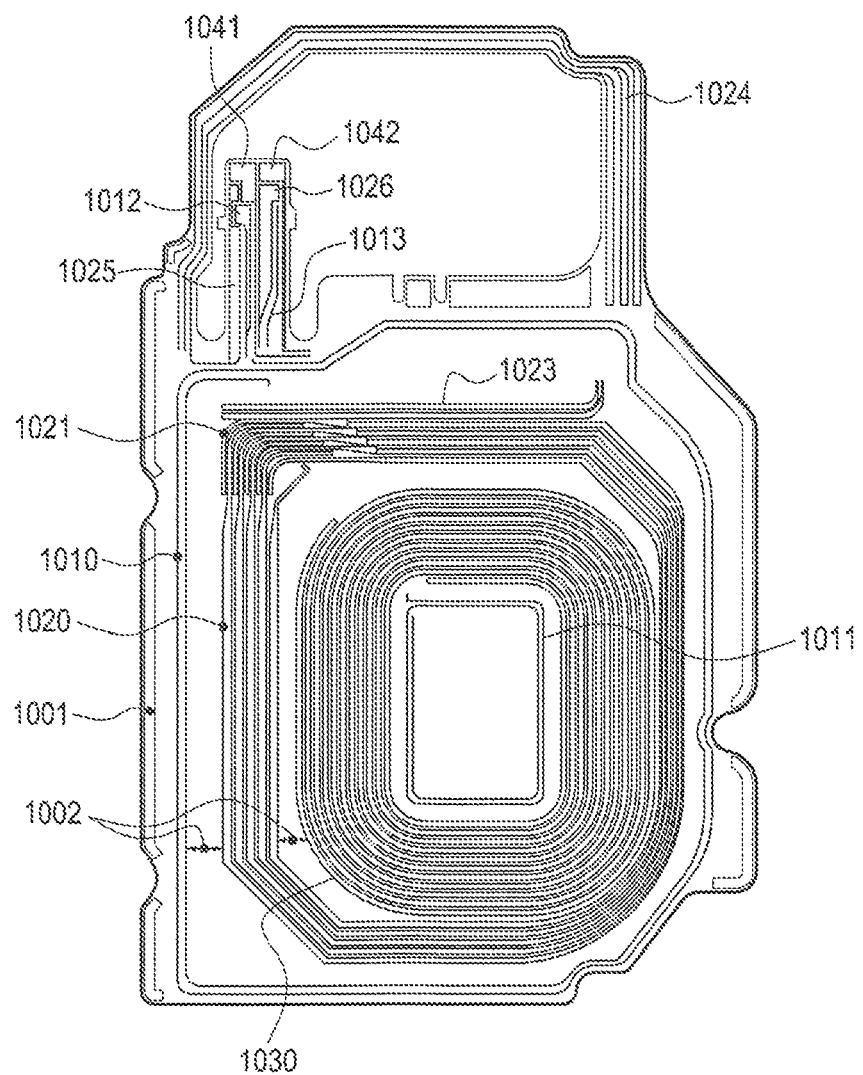
FIG. 10A is a plan view illustrating a first layer on which a plurality of coils are disposed according to various embodiments of the present disclosure.

FIG. 10A is a plan view illustrating the first layer on which a plurality of coils are disposed according to various embodiments of the present disclosure. An MST coil 1020 may be disposed on the first layer. For example, the MST coil 1020 may have a winding form having five turns on the first layer and have the closed loop structure.

Referring to FIG. 10A, each start point of the MST coil 1020 may have the closed structure from the outside by a connection part 1021 connected to an end point. The MST coil 1020 may be connected to an MST coil 1050 on the second layer through a conductor, that is, a via set.

In addition, an additional MST pattern 1024 may be disposed on the first layer, and MST input/output patterns 1025 and 1026 for connecting an input terminal and an output terminal with the MST pattern 1024 or the MST coil 1020 may be further disposed on the first layer.

An NFC coil 1010 may be disposed on the first layer. Further, NFC input/output patterns 1012 and 1013 for connecting the NFC coil 1010 and the input/output terminals may be disposed. The NFC coil 1010 may be disposed on the outer side of the MST coil 1020.

A wireless charging coil 1030 may be disposed on the inner side of the MST coil 1020. The wireless charging coil 1030 may be manufactured to have a resonant frequency defined in an induction type (for example, WPC standard type) or a resonance type (for example, A4WP standard type). In addition, an NFC coil 1011 may be disposed on the inner side of the wireless charging coil 1030. In addition, input/output terminal connection parts 1041 and 1042 for a temperature measuring circuit may be further disposed on the first layer. A dummy pattern 1001 may be disposed on the first layer. Further, an interval 1002 may be configured for separation between the NFC coil 1010 and the MST coil 1020 and separation between the MST coil 1020 and the wireless charging coil 1030. The dummy pattern 1101 may prevent cracks which may be generated in each coil by compensating for a rigidity of a thin coil FPCB. The interval 1002 may reduce an effect of one coil on another. In addition, the NFC coil 1010 and the wireless charging coil 1030 may also be implemented in the structure including a plurality of sub coils connected in series through the conductor, that is, the via set.

Figure 10B:
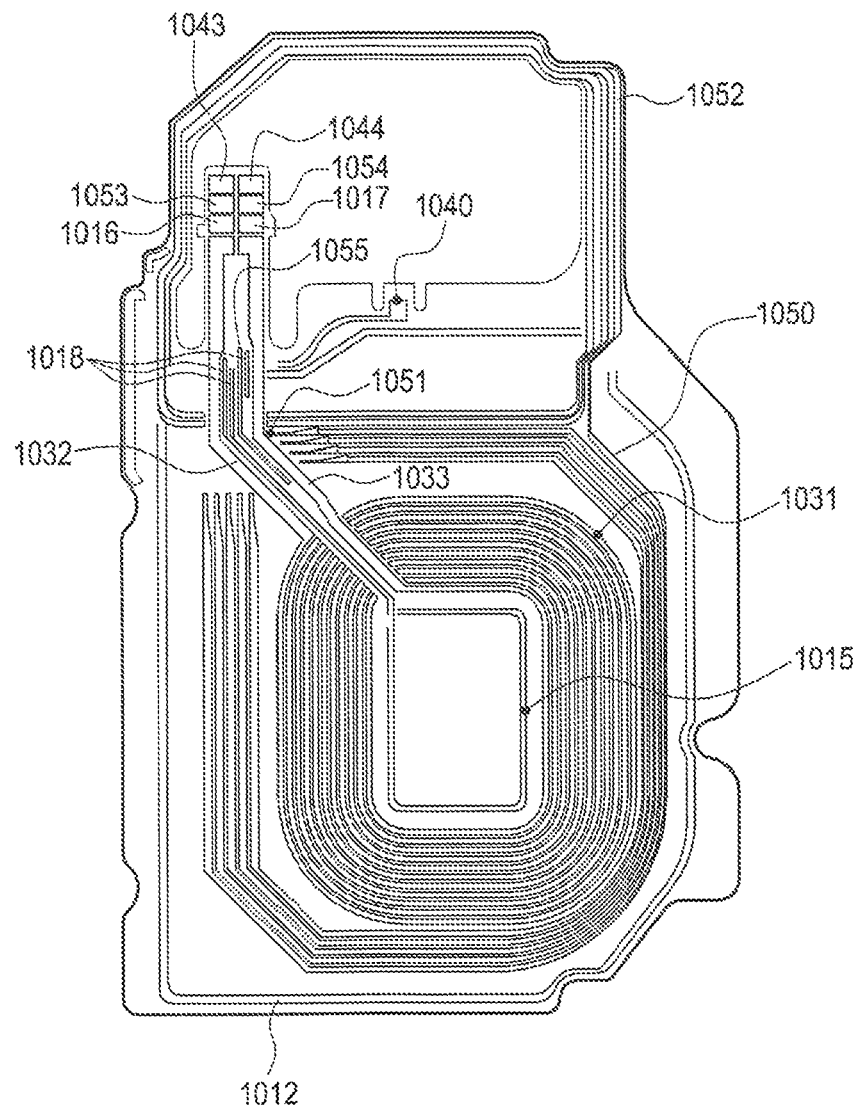
FIG. 10B is a plan view illustrating a second layer on which a plurality of coils are disposed according to various embodiments of the present disclosure.

FIG. 10B is a plan view illustrating a second layer on which a plurality of coils are disposed according to various embodiments of the present disclosure. An MST coil 1050 may be disposed on the second layer. The MST coil 1050 on the second layer may be connected to the MST coil 1020 on the first layer in a vertical direction through the conductor, that is, the via set. MST input/output terminals 1053 and 1054 may be disposed on the second layer. The current may be applied to MST coils 1020 and 1050 and MST patterns 1024, 1052, and 1055 and then output through the MST input/output terminals 1053 and 1054. A connection part 1051 of the MST coil 1050 cannot contact the other end and thus cannot be closed from the outside, and may have the opened loop form. As the MST coil 1050 has the opened loop form, a wireless charging coil 1031 may be connected to the input/output terminals through the interval of the MST coil 1050. More specifically, wireless charging input/output patterns 1032 and 1033 may be disposed on the interval of the MST coil 1050. The input/output terminals may be connected to patterns of a PCB by a connection part such as a C-CLIP. The input/output terminals may be interchanged according to a change in plus/minus pulse phases transmitted from a communication module. For example, one terminal operates as an input terminal for a minus phase and operates as an output terminal for a plus phase.

The wireless charging coil 1031 may be connected to the wireless charging coil 1030 disposed on the first layer through the conductor, that is, the via set. Further, the wireless charging coil 1031 may perform wireless charging by outputting the current corresponding to an external magnetic field or electromagnetic field. Alternatively, the wireless charging coil 1031 may induce the magnetic field by using the applied current or induce the electromagnetic field by forming a resonant circuit together with another coil, so as to wirelessly charge another electronic device. The wireless charging coil 1031 may be disposed on the inner side of the MST coil 1050.

An NFC coil 1012 may be disposed on the second layer. The NFC coil 1012 may be connected to the NFC coil 1010 on the first layer through a conductor, that is, a via set. NFC patterns 1013 and 1014 may be also disposed on the second layer, and may be also connected to the NFC coil 1010 or the NFC input/output patterns 1012 and 1013 on the first layer in a vertical direction through the conductor, that is, the via set. NFC input/output terminals 1016 and 1017 may be connected to the NFC input/output patterns 1012 and 1013 in a vertical direction through the conductor, that is, the via set and, accordingly, the NFC input/output patterns 1012 and 1013 may be connected to NFC coils 1010, 1011, 1012, and 1015. The NFC coil 1015 may be disposed on the inner side of the MST coil 1050, and may be connected to an NFC pattern 1018 as the MST coil 1050 has the opened loop form. A temperature measuring circuit 1040 and input/output terminals 1043 and 1044 for a temperature measuring circuit, which are connected to the input/output terminal connection parts 1041 and 1042 for the temperature measuring circuit on the first layer in a vertical direction through the conductors, that is, the via sets, may be disposed on the second layer. The temperature measuring circuit 1040 may measure a temperature by heat, may be generated when the current is applied to each coil, and deliver the measured temperature to a processor, and the processor may control the size of the applied current based on the received temperature. Accordingly, it is possible to prevent the coils from being overheated.

As described above, according to various embodiments of the present disclosure, a plurality of coils have a structure in which various coils such as the MST coil, the wireless charging coil, and the NFC coil are connected in a vertical direction through the conductors, that is, the via sets, thereby increasing inductance of each coil and thus guaranteeing effective wireless charging or good transmission/reception of signals.

Figure 10C:
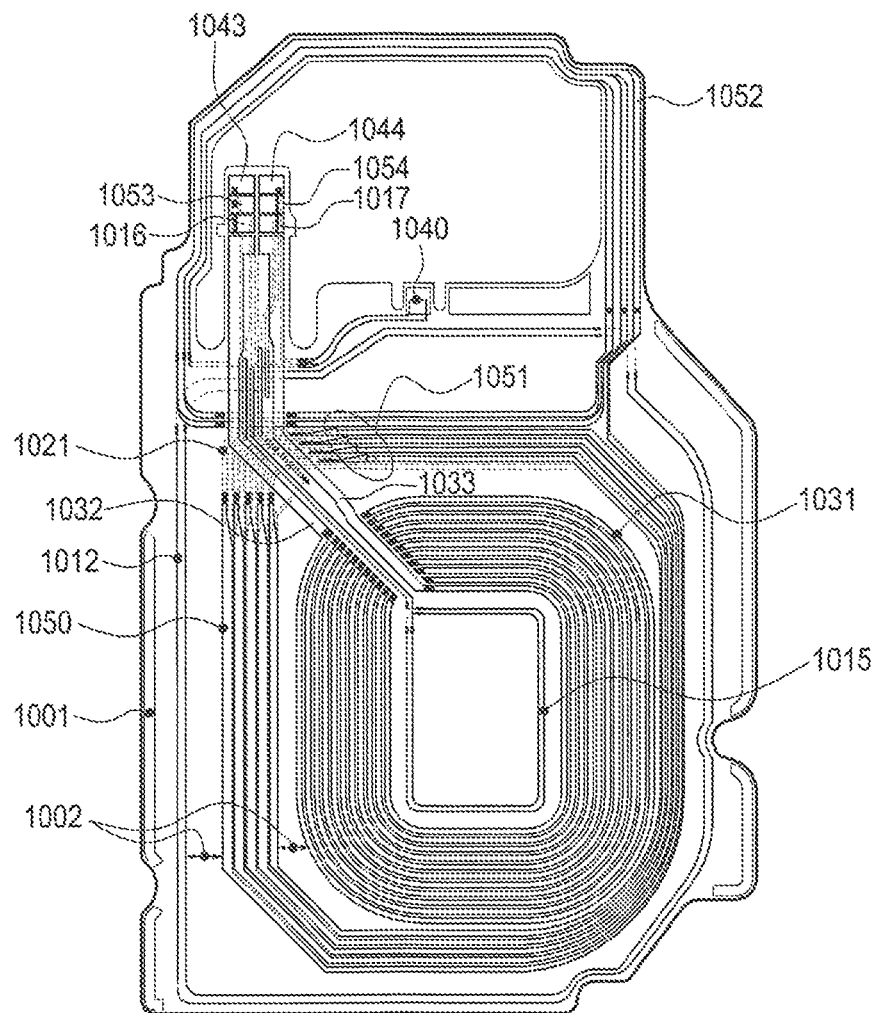
FIG. 10C is a plan view illustrating overlapping of the first layer structure of FIG. 10A and the second layer structure of FIG. 10B.

FIG. 10C is a plan view illustrating overlapping of the first layer structure of FIG. 10A and the second layer structure of FIG. 10B. In FIG. 10C, a mark of "•" may indicate a conductor, that is, a via set, and the conductor is disposed on a position marked by "•" and connects corresponding structures of the first layer and the second layer. As illustrated in FIG. 10C, the MST coil disposed on the first layer and the MST coil disposed on the second layer may have a structure in which most parts thereof except for the connection parts 1021 and 1051 overlap each other. An overlapping relation in the connection parts 1021 and 1051 will be described in more detail with reference to FIGS. 11A to 11C. In addition, the structure in which most areas of a pattern of the first layer and a pattern of the second layer overlap each other is only an example, and the electronic device according to various embodiments of the present disclosure may have a structure in which the pattern of the first layer and the pattern of the second layer do not overlap each other.

Figure 11A:
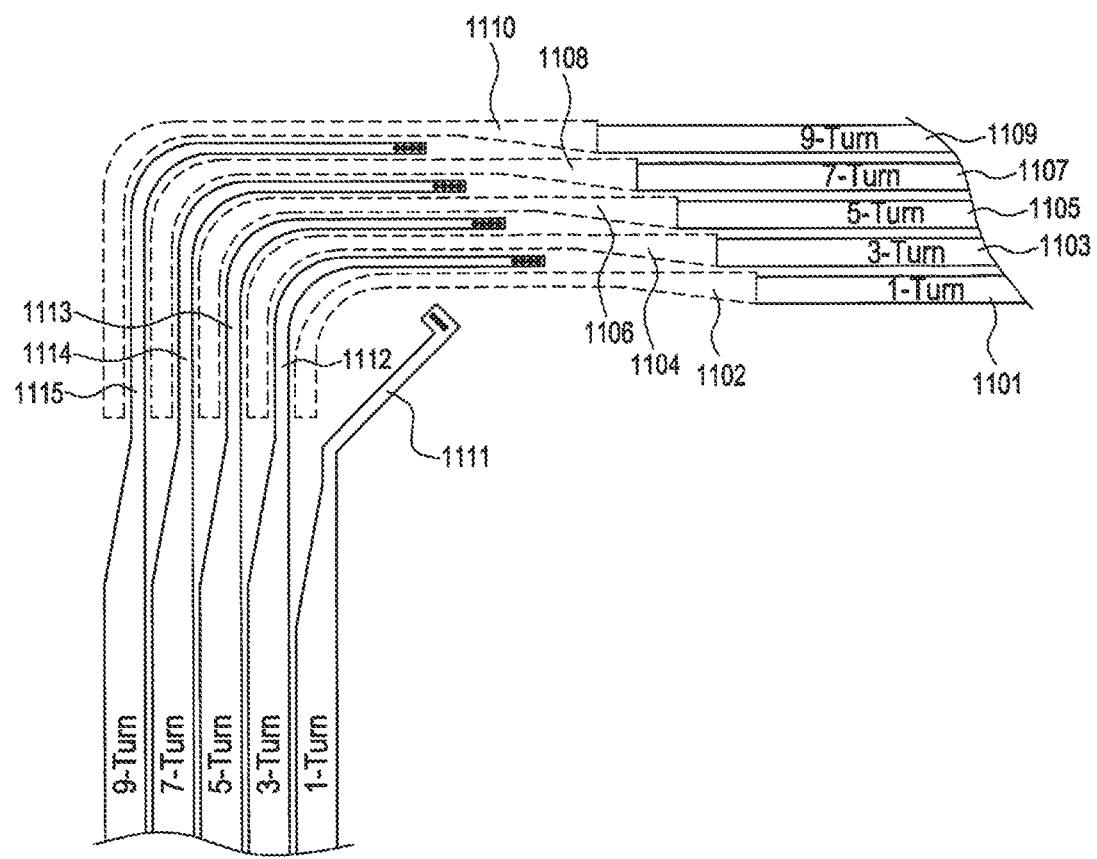
FIGS. 11A to 11C are diagrams illustrating a connection relation in connection parts of coils according to various embodiments of the present disclosure.
Figure 11B:
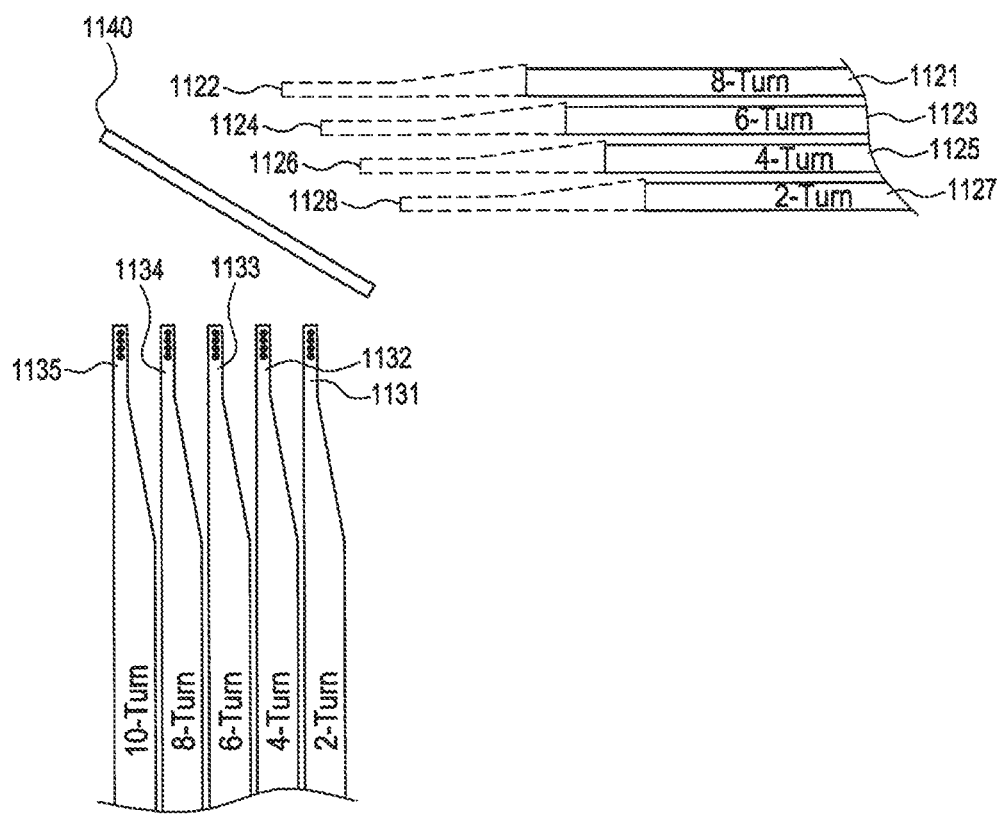
Figure 11C:
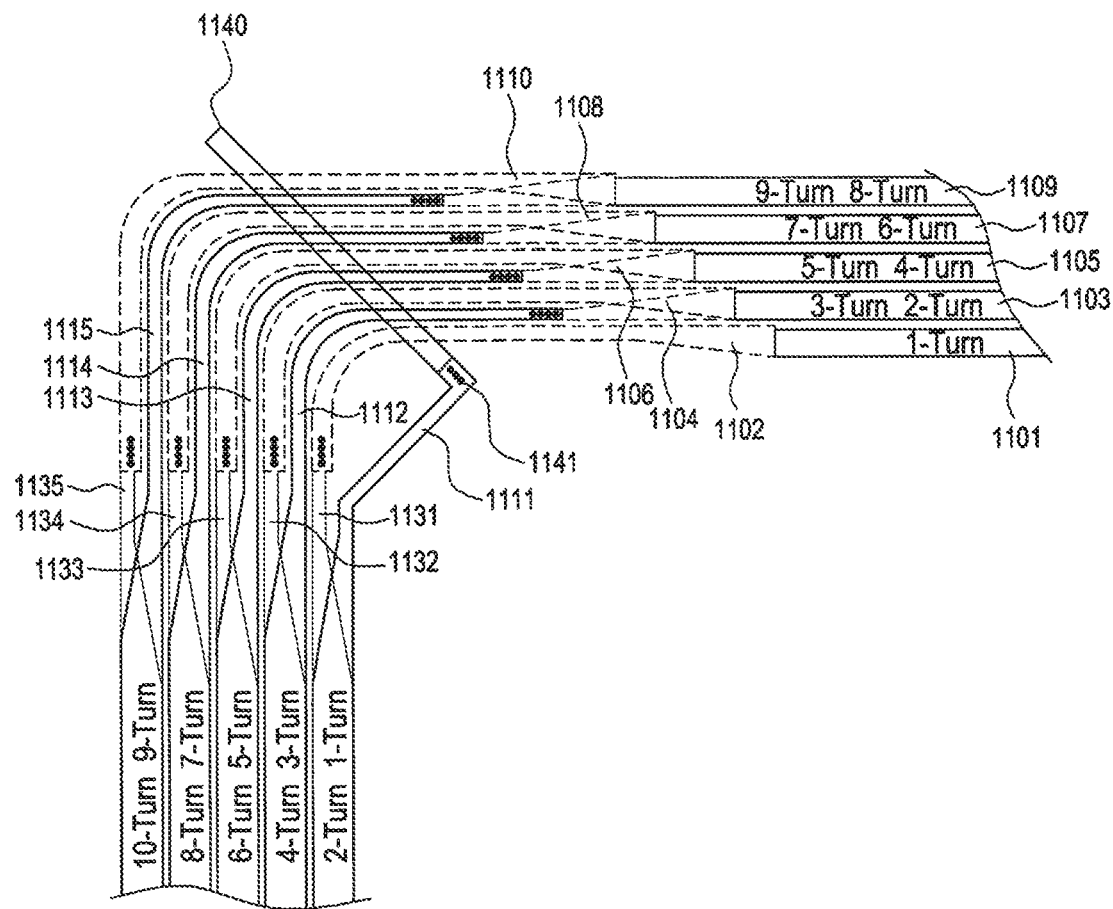

FIGS. 11A to 11C are diagrams illustrating the connection relation in the connection parts of the coils according to various embodiments of the present disclosure. FIG. 11A is a plan view illustrating some of the coils disposed on the first layer.

Referring to FIG. 11A, coils having the closed loop form may be disposed on the first layer. For example, a first coil 1101, a third coil 1103, a fifth coil 1105, a seventh coil 1107, and a ninth coil 1109 may be disposed on the first layer. The first coil 1101 may include a first connection part 1102 and a second connection part 1111. Although FIG. 11A illustrates only particular parts of the coils and, accordingly, the first connection part 1102 and the second connection part 1111 seem like separated hardware, which are not connected to each other, the first connection part 1102 and the second connection part 1111 are connected to each other and constitute the first coil 1101. In addition, the third coil 1103 may be disposed on the outer side of the first coil 1101. The third coil 1103 may include a fifth connection part 1104 and a sixth connection part 1112. The fifth coil 1105 may be disposed on the outer side of the third coil 1103. The fifth coil 1105 may include a ninth connection part 1106 and a tenth connection part 1113. The seventh coil 1107 may be disposed on the outer side of the fifth coil 1105. The seventh coil 1107 may include a thirteenth connection part 1108 and a fourteenth connection part 1114. The ninth coil 1109 may be disposed on the outer side of the seventh coil 1107. The ninth coil 1109 may include a seventeenth connection part 1110 and an eighteenth connection part 1115.

The first connection part 1102, the fifth connection part 1104, the ninth connection part 1106, the thirteenth connection part 1108, and the seventeenth connection part 1110 may have widths smaller than the winding pattern and have a form in which a width is reduced in an up direction of the winding pattern from the winding pattern. In addition, the second connection part 1111, the sixth connection part 1112, the tenth connection part 1113, the fourteenth connection part 1114, and the eighteenth connection part 1115 may have a form in which the width is reduced in a down direction from the winding pattern. Accordingly, for example, the fifth connection part 1104 and the sixth connection part 1112 may have a structure in which they do not overlap each other, and the two connection parts 1104 and 1112 may be disposed together within the width of one winding pattern. Further, in the remaining winding pattern except for the connection parts, a sufficiently thick width is secured, and thus resistance may be reduced and a strength of the applied current may increase.

Referring to FIGS. 11A and 11C, conductors, that is, via sets may be formed on the second connection part 1111, the sixth connection part 1112, the tenth connection part 1113, the fourteenth connection part 1114, and the eighth connection part 1115. For example, the conductor connected to the sixth connection part 1112 may connect the sixth connection part 1112 and the second coil 1127 on the second layer. More specifically, the conductor of the sixth connection part 1112 may connect the sixth connection part 1112 and the third connection part 1128 of the second coil 1127 in a vertical direction. Further, the conductor of the tenth connection part 1113 may connect the tenth connection part 1113 and the seventh connection part 1126 of the fourth coil 1125 in a vertical direction. Further, the conductor of the fourteenth connection part 1114 may connect the fourteenth connection part 1114 and the eleventh connection part 1124 of the sixth coil 1123 in a vertical direction. Further, the conductor of the eighteenth connection part 1115 may connect the eighteenth connection part 1115 and the fifteenth connection part 1122 of the eighth coil 1121 in a vertical direction.

Referring to FIGS. 11B and 11C, the second connection part 1111 may receive the current from an input pattern 1140, and the current may be applied to the first coil 1101, and to the second coil 1127 through the fourth connection part 1131 along the conductor connected to the first connection part 1101. Further, the conductor of the fourth connection part 1131 may connect the fourth connection part 1131 and the first connection part 1102 in a vertical direction. In addition, the current applied from the fourth connection part 1131 may be transferred to the third connection part 1128 after being applied to the second coil 1127. Further, the conductor of the seventh connection part 1126 may connect the third connection part 1128 and the sixth connection part 1112 of the third coil 1103 in a vertical direction. Accordingly, the current input into the third connection part 1128 may be transferred to the sixth connection part 1112 of the third coil 1103. The current input through the sixth connection part 1112 may be transferred to the fifth connection part 1104 after being applied to the third coil 1103. The fifth connection part 1104 may be connected to the eighth connection part 1132 of the fourth coil 1125. Accordingly, the fourth coil 1125 receives the current from the eighth connection part 1132, and then the applied current may be transferred to the fifth coil 1105 through the seventh connection part 1126. The current transferred from the input pattern 1140 disposed on the second layer may be transferred to the second connection part 1111 through the via set 1141. According to the above described scheme, the current input through the second connection part 1111 may be sequentially applied in an order of the first coil 1101, the second coil 1127, the third coil 1103, . . . , the eighth coil 1121, and the ninth coil 1109. In addition, the ninth coil 1109 may be connected to the tenth coil 1135 and, accordingly, the current may be applied to the tenth coil 1135. Accordingly, the electronic device according to various embodiments of the present disclosure may dispose a coil with 10 turns in a space in which 5 turns are possible and the size of a magnetic field induced when the same current is applied may increase according to the number of turns.

The conductors, that is, first via sets that connect the second coil 1127, the fourth coil 1125, the sixth coil 1123, and the eighth coil 1121 with the third coil 1103, the fifth coil 1105, the seventh coil 1107, and the ninth coil 1109, respectively may be adjacent to each other. Further, the conductors, that is, second via sets that connect the second coil 1127, the fourth coil 1125, the sixth coil 1123, and the eighth coil 1121 with the first coil 1101, the third coil 1103, the fifth coil 1105, and the seventh coil 1107, respectively may be adjacent to each other. Directions of currents flowing in the first via sets may be the same, directions of currents flowing in the second via sets may be the same, and the directions of the currents flowing in the first via sets may be different from the directions of the currents flowing in the second via sets. Accordingly, via sets in which the currents flow in the same direction may be adjacent to each other, thereby maximizing strengths of induced magnetic fields formed by the first via sets and the second via sets.

Hereinafter, a performance of the coil according to various embodiments of the present disclosure will be compared with a performance of the coil according to a comparative example. First, a coil structure according to the comparative example will be described with reference to FIGS. 12A and 12B.

Figure 12A:
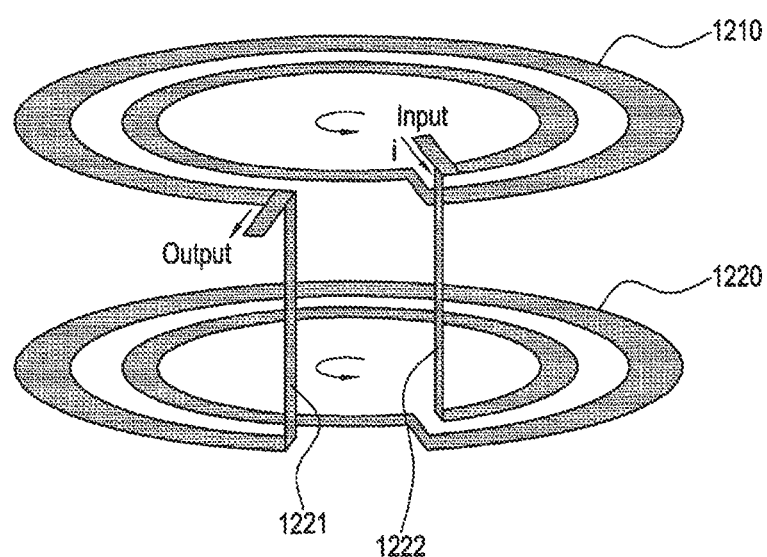
FIGS. 12A and 12B illustrate a coil structure according to various embodiments of the present disclosure.

Referring to FIG. 12A, in the structure according to the comparative example, a coil 1210 with 2 turns may be disposed on a first layer (1-layer). A coil 1220 with 2 turns may be disposed on a second layer (2-layer), and the two coils 1210 and 1220 may be connected in parallel. Such a structure may be named a parallel type coil. In the parallel type coil, when the two coils 1210 and 1220 are connected by a pair of via sets, it may be construed equally as a short conducting wire if resistance is very small. Accordingly, the current may be applied to only one coil rather than to two coils having small resistance, which may act as a problem.

Figure 12B:
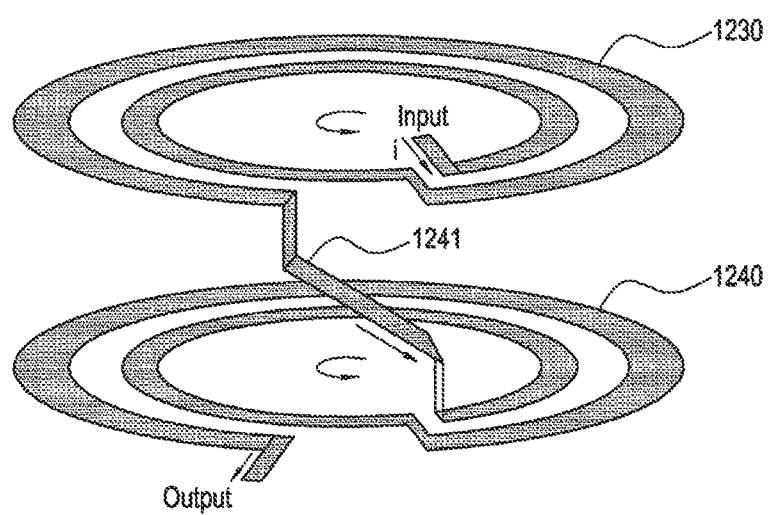

Referring to FIG. 12B, in the structure according to the comparative example, a coil 1230 with 2 turns may be disposed on a first layer (1-layer). A coil 1240 with 2 turns may be disposed on a second layer (2-layer), and the two coils 1230 and 1240 may be connected in series through a conductor 1241. Such a structure may be named a cascade type coil. The cascade type coil can be designed when the number of turns of the coil disposed on each layer is singular, but the design may be difficult if the number of turns of the coils disposed on each layer is plural. As illustrated in FIG. 12B, in order to connect the coil 1230 on the first layer and the coil 1240 on the second layer in the cascade type coil structure in series, the conductor 1241 should be manufactured in an inwardly bent form, which requires a very difficult design scheme in that the via set can be designed only in a vertical direction. Alternatively, in order to manufacture the cascade type coil, one additional layer for changing a direction of the conductor should be inserted between the first layer and the second layer, which results in increasing a mounting thickness.

In contrast to the comparative examples according to FIGS. 12A and 12B, a first coil with one winding on the first layer may be connected to a second coil with one winding on the second layer in series, the second coil on the second layer may be connected to a third coil with one winding on the first layer, and the third coil may be connected to a fourth coil with one winding on the second layer in the structure according to the present disclosure. The structure according to present disclosure may be named a spiral type coil.

Table 1 below corresponds to a table for a comparison between electrical characteristics of the coils according to the comparative examples and the coil, that is, the spiral type coil according to an embodiment of the present disclosure.

TABLE 1

| Coil type | Thickness (mm) | Inductance (uH) | Resistance (ohm) |
|---|---|---|---|
| Parallel type coil | 122.8 | 17.9 | 1.873 |
| Cascade type coil | 122.0 | 17.9 | 1.495 |
| Spiral type coil (coil according to the embodiment of the present disclosure) | 122.0 | 17.89 | 1.432 |

All materials of the coils in Table 1 above are the same and are disposed within the same space. As noted through FIG. 1, resistance of the parallel type coil is the highest and inductances may have similar values.

Figure 13:
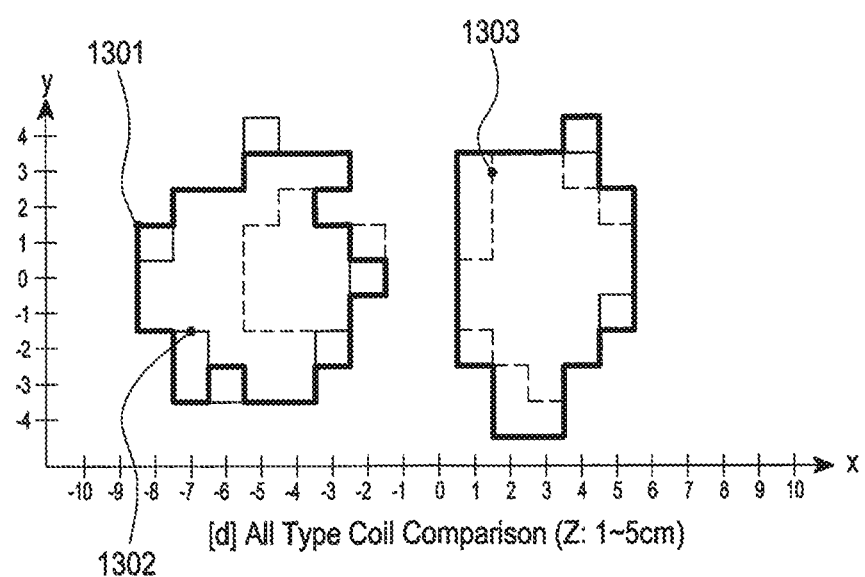
FIG. 13 is a graph of an MST signal recognition success rate according to various embodiments of the present disclosure.

FIG. 13 is a graph of an MST signal recognition success rate according to various embodiments of the present disclosure.

Referring to FIG. 13, an area indicated by reference numeral "1301" may refer to the recognized area according to the embodiment of the present disclosure, which corresponds to an area having a success rate larger than a preset threshold. Reference numeral "1302" refers to the recognized area for the cascade type coil, and reference numeral "1303" refers to the recognized area for the parallel type coil. The recognized area may be area of which strength of received signal is larger than predetermined threshold. As noted through FIG. 13, the spatial area of the recognized area of the coil according to the embodiment of the present disclosure may be the largest, which may mean that a coil recognizable range according to the present disclosure is the widest. Particularly, as shown in Table 1 above, the coil according to the embodiment of the present disclosure has the widest recognition success area by the coil even though inductances of the coil according to the embodiment of the present disclosure and the remaining coils have similar values, which may mean that the magnetic field additionally formed by the conductor, that is, the via set distributes to the recognition success. Table 2 below shows recognition success rates according to a distance between the electronic device and the POS terminal.

TABLE 2

| Coil type | Distance between electronic device and POS terminal is 1 cm | Distance between electronic device and POS terminal is 3 cm | Distance between electronic device and POS terminal is 5 cm |
|---|---|---|---|
| Parallel type coil | 49.21% | 46.56% | 19.05% |
| Cascade type coil | 51.85% | 52.91% | 34.92% |
| Spiral type coil (coil according to the embodiment of the present disclosure) | 58.73% | 58.20% | 38.10% |

As noted through Table 2 above, the coil according to the embodiment of the present disclosure has a higher recognition success rate than that of the coil according to the comparative example. Particularly, as shown in Table 1 above, the coil according to the embodiment of the present disclosure has the highest recognition success rate even though inductances of the coil according to the embodiment of the present disclosure and the remaining coils have similar values, which may mean that the magnetic field additionally formed by the conductor, that is, the via set contributes to the recognition success.

Figure 14A:
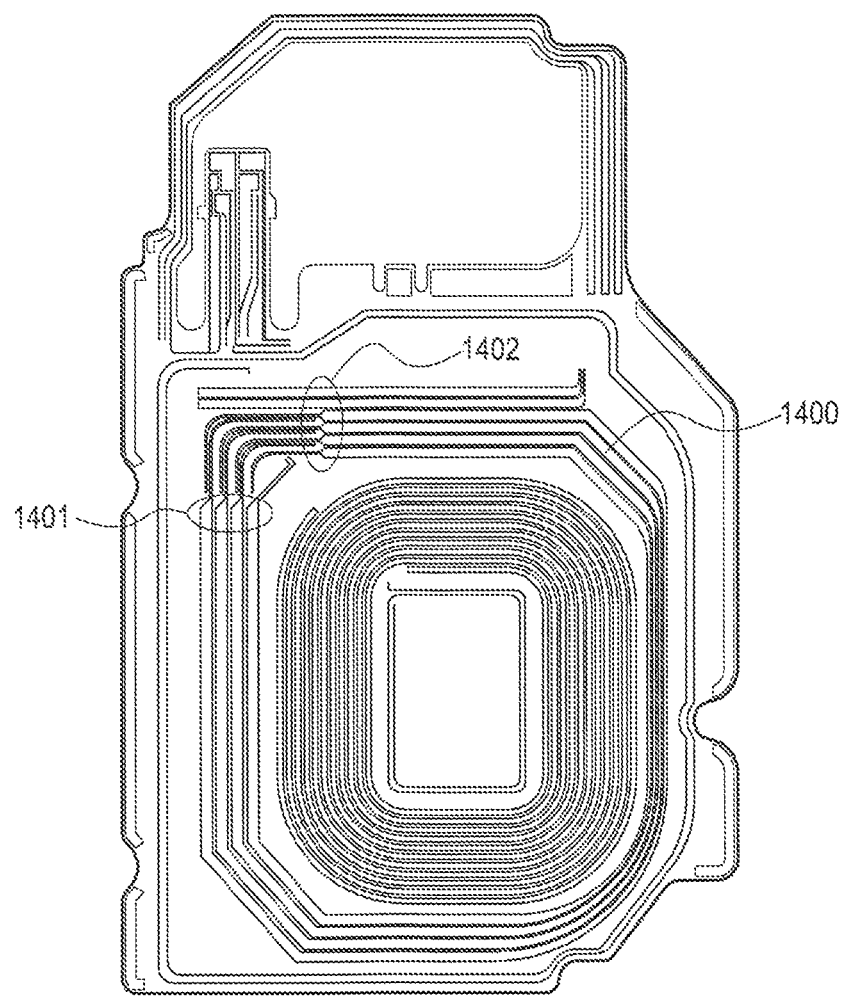
FIGS. 14A to 14F illustrate a coil in a three layered structure according to various embodiments of the present disclosure.
Figure 14B:
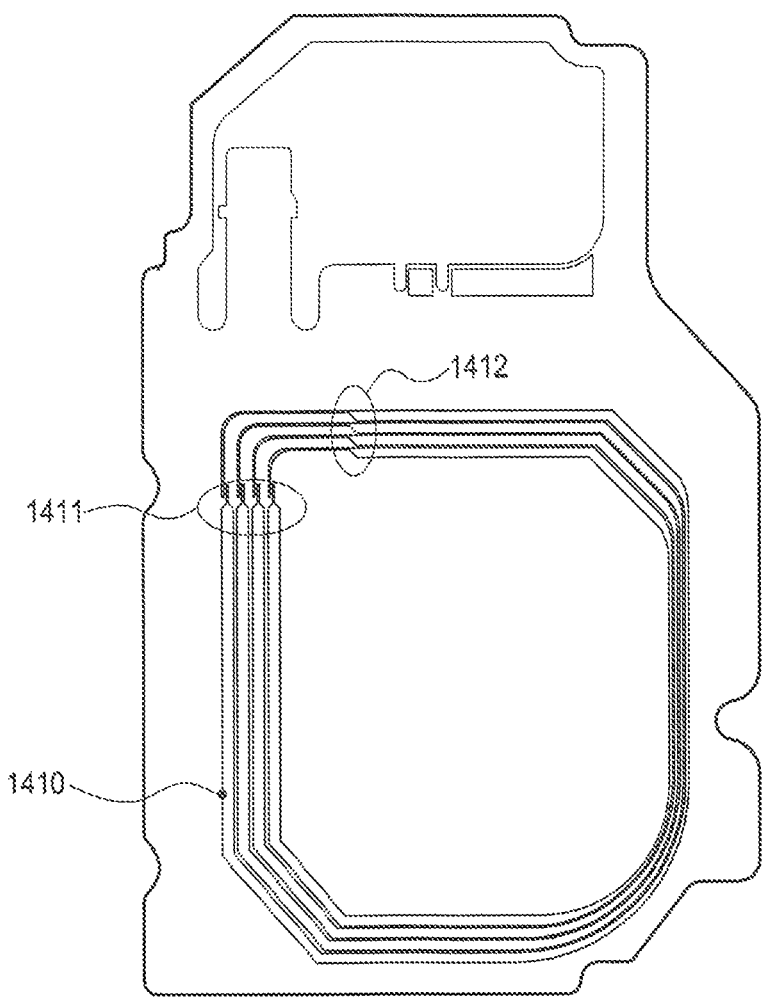
Figure 14C:
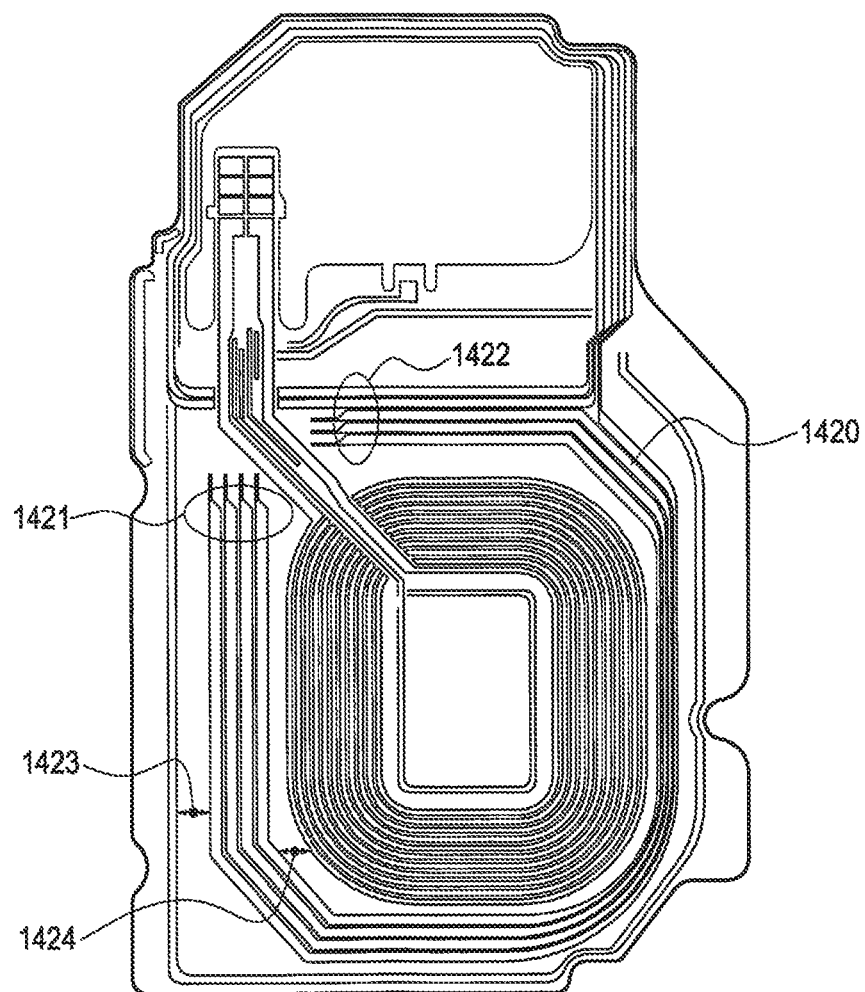

FIGS. 14A to 14C illustrate a coil in a three layered structure according to various embodiments of the present disclosure. FIG. 14A illustrates a pattern of a first layer, FIG. 14B illustrates a pattern of a second layer, and FIG. 14C illustrates a pattern of a third layer. In FIGS. 14A to 14C, a description of the part that overlaps FIGS. 10A and 10B will be omitted. In FIGS. 14A to 14C, forms of connection parts in the three layered structure will be mainly described.

Figure 14D:
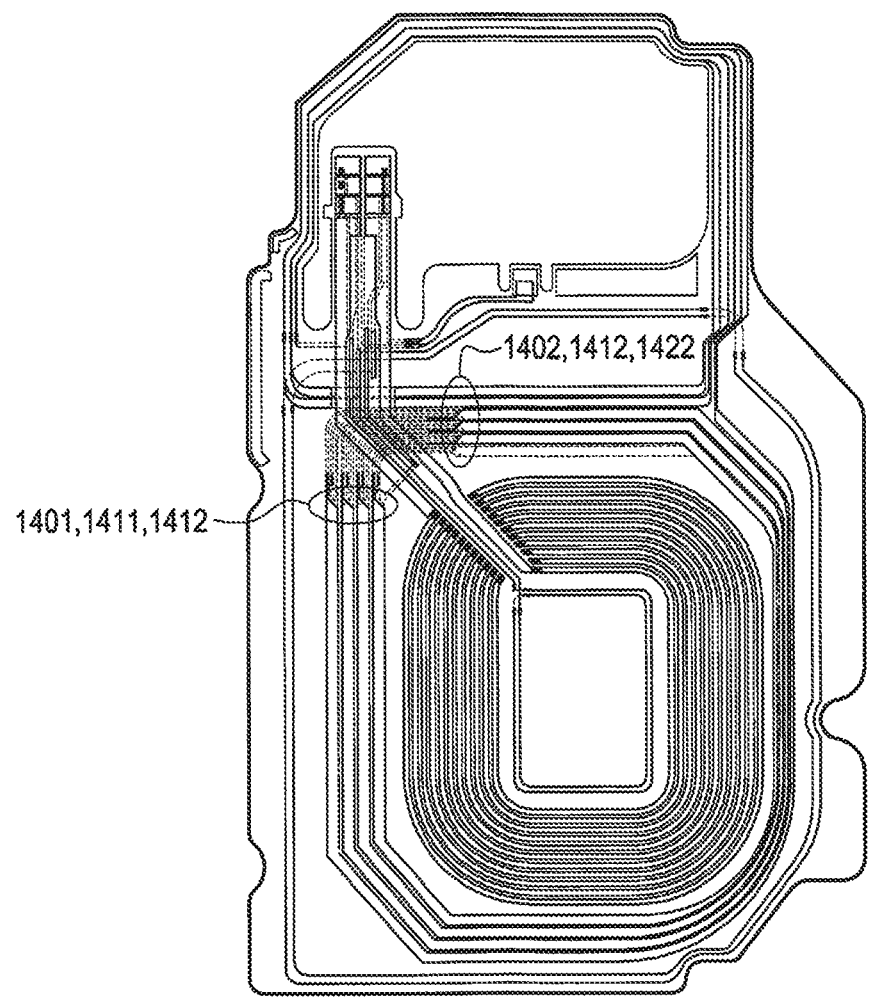
Figure 14E:
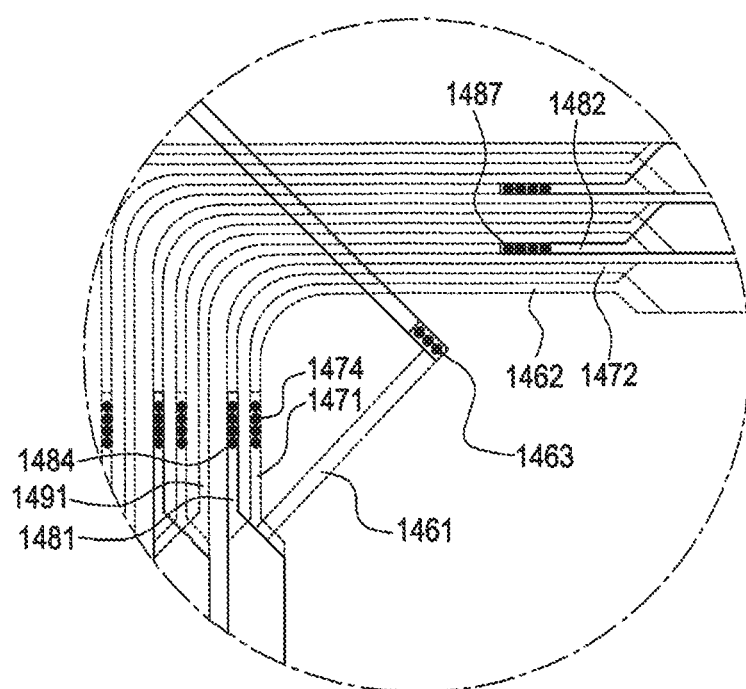

As illustrated in FIG. 14A, an MST coil 1400 may include a first connection part 1401 and a second connection part 1402. The first connection part 1401 may have a form in which a width relatively decreases from a winding pattern to a lower end of the winding pattern. The second connection part 1402 may have a form in which a width relatively decreases from the winding pattern to a center of the winding pattern. In addition, the MST coil 1410 on the second layer may include a third connection part 1411 and a fourth connection part 1412. The third connection part 1411 may have a form in which a width relatively decreases from the winding pattern to a center of the winding pattern. The fourth connection part 1412 may have a form in which a width relatively decreases from the winding pattern to an upper end of the winding pattern. In addition, a conductor, that is, a via set formed on the second connection part 1402 may connect the third connection part 1411 and the second connection part 1402 in a vertical direction. In addition, the MST coil 1420 on the third layer may include a fifth connection part 1421 and a sixth connection part 1422. The fifth connection part 1421 may have a form in which a width relatively decreases from the winding pattern to an upper end of the winding pattern. The sixth connection part 1422 may have a form in which a width relatively decreases from a winding pattern to a lower end of the winding pattern. A conductor, that is, a via set formed on the fifth connection part 1421 may connect the fifth connection part 1421 and the fourth connection part 1412 in a vertical direction. In addition, a conductor, that is, a via set formed on the sixth connection part 1422 may connect the sixth connection part 1422 and the first connection part 1401 in a vertical direction. Accordingly, the MST coil 1420 on the third layer is connected to the MST coil 1400 on the first layer, and the innermost coil on the third layer may be connected to a second inner coil on the first layer. Accordingly, as illustrated in FIGS. 14D and 14E, an order of the connected coils may be the innermost coil on the first layer, the innermost coil on the second layer, and the innermost coil on the third layer, and the innermost coil on the third layer may be connected to the second inner coil on the first layer. FIG. 14E illustrates parts enlarged from connection parts of FIG. 14D. As illustrated in FIG. 14E, a seventh connection part 1461 of the coil on the first layer may be connected to a current source through a conductor 1463. A current supplied through the seventh connection part 1461 may be applied to the innermost coil on the first layer. The current applied to the innermost coil on the first layer may be applied to an eighth connection part 1462. A conductor 1474 formed on the eighth connection part 1462 may connect the eighth connection part 1462 with a ninth connection part 1471 of the innermost coil on the second layer. Accordingly, the current applied to the innermost coil on the first layer may be applied to the innermost coil on the second layer through the conductor 1474. The current applied to the innermost coil on the second layer may be applied to a tenth connection part 1472. A conductor 1481 formed on the tenth connection part 1472 may connect the tenth connection part 1472 with an eleventh connection part 1481 of the innermost coil on the third layer. Accordingly, the current applied to the innermost coil on the second layer may be applied to the innermost coil on the third layer through the conductor 1481. The current applied to the innermost coil on the third layer may be applied to a twelfth connection part 1482. A conductor 1487 formed on the twelfth connection part 1482 may connect the twelfth connection part 1482 with a thirteenth connection part 1491 of a coil adjacent to the outer side of the innermost coil on the first layer. Accordingly, the current applied to the innermost coil on the third layer may be applied to the coil adjacent to the outer side of the innermost coil on the first layer. As a result, an order of coils to which the current is applied or a coil connection order may be $C_{11}$, $C_{21}$, $C_{12}$, $C_{22}$, $C_{31}$, $C_{32}$, .... In $C_{ij}$, i may denote a layer and j may denote an order of the disposition from the inner side. For example, $C_{21}$ may be a first coil from the inner side on the second layer, and $C_{32}$ may be a second coil from the inner side on the third layer.

Figure 14F:
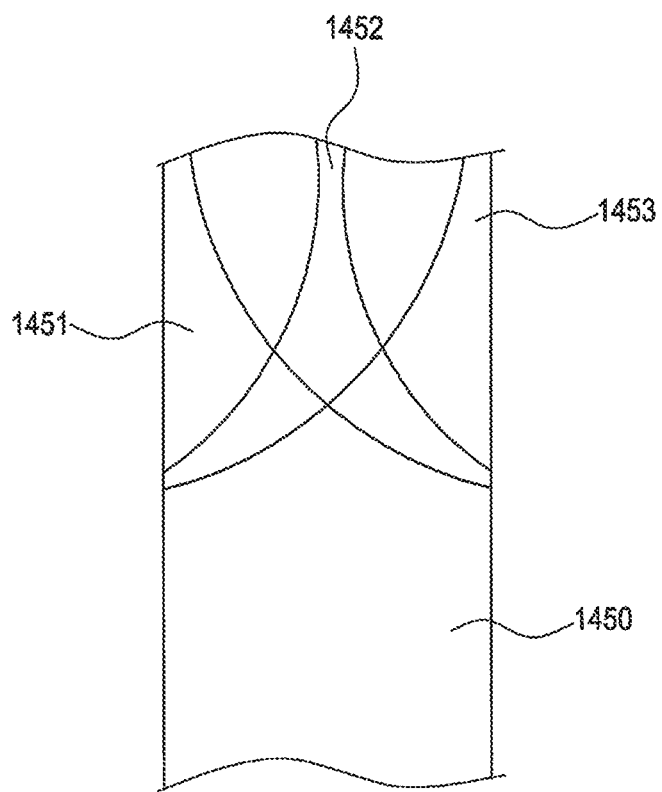

In addition, a width of the winding pattern of the MST coil may further increase in comparison with the width of the winding pattern on two layers. This may be caused from connection parts 1451, 1452, and 1453 in a form in which widths decrease in three directions with respect to one winding pattern 1450 as illustrated in FIG. 14F. That is, since the connection parts 1451, 1452, and 1453 have three forms and the widths of the connection parts 1451, 1452, and 1453 should be sufficiently secured, the width of the winding pattern 1450 may be wider than that of the winding pattern on two layers. However, as the width of the winding pattern increases, the number of turns on three layers may be smaller than the number of turns on two layers. For example, in FIGS. 14A to 14C, the number of turns of the coil on each layer may be 4, which may be smaller than the number of turns in FIGS. 10A and 10B that is 5. However, the total number of turns of the coils on the three layers may be 4×3=12 and the total number of turns of the coils on the two layers may be 5×2=10, so that the total number of turns of the coils on the three layers may be larger. As the total number of turns increases, inductance may also increase. Further, as the width of the winding pattern is wider compared to the coil on the second layer, resistance of the winding pattern may decrease and thus size of the applied current may increase. In addition, intervals 1423 and 1424 between coils are provided, thereby minimizing interference of each coil. As described above, the coils according to various embodiments of the present disclosure may be implemented in the three layered structure, and there is no limitation in the number of layers of the coils.

Figure 15A:
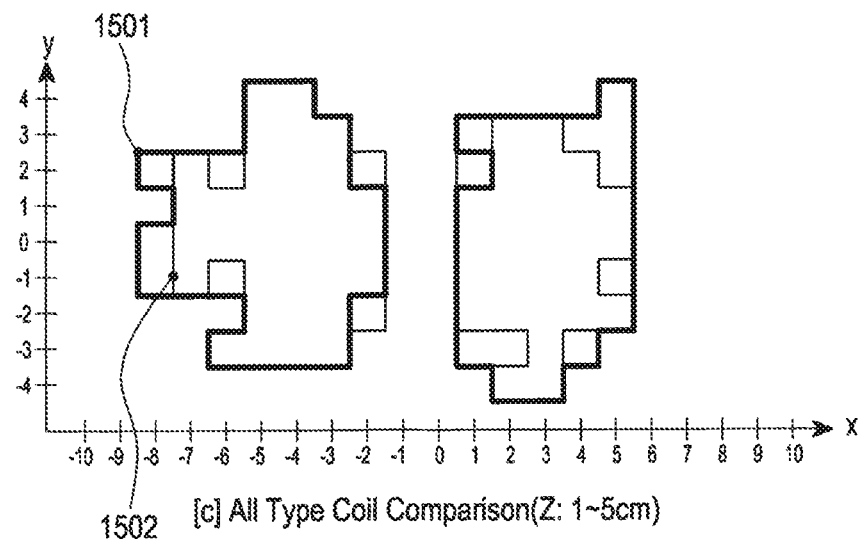
FIG. 15A illustrates a result of recognized area.
Figure 15B:
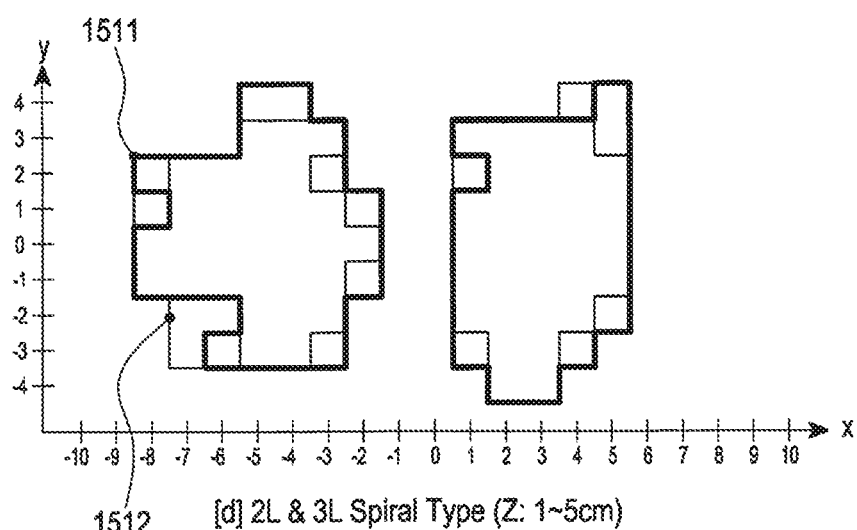
FIG. 15B illustrates a recognition success rate of the coils in the two layered structure and the coils in the three layered structure according to the present disclosure.

FIGS. 15A and 15B are graphs of recognition success rates according to a location for a comparison between performances of the coils in the three layered structure according to various embodiments of the present disclosure and the coils in the three layered structure according to the comparative example. Table 3 below illustrates a comparison between electrical characteristics of the coils according to the comparative example and the coil, that is, the spiral type coil according to the embodiment of the present disclosure.

TABLE 3

| Coil type | Thickness (mm) | Inductance (uH) | Resistance (ohm) |
|---|---|---|---|
| Cascade type coil | 137.5 | 25.00 | 1.567 |
| Spiral type coil (coil according to the embodiment of the present disclosure) | 136.0 | 25.10 | 1.576 |

All materials of the coils in Table 3 above are the same and are disposed within the same space. As noted through Table. 3, resistances and inductances of the two coils may have similar values.

In addition, each of an x axis value and a y axis value may indicate a coordinate with respect to a distance and may have a unit, for example, cm in FIGS. 15A and 15B. The origin may indicate, for example, a center point of the coil of the POS terminal. That is, in FIGS. 15A and 15B, the coordinate (a, b) may mean that the electronic device according to the present disclosure is disposed to the right side by a cm and to the upper side by b cm from the center of the coil of the POS terminal. FIG. 15A illustrates a result of recognized area. For example, an area indicated by reference numeral "1501" of FIG. 15A may refer to a recognized area according to an embodiment of the present disclosure, which corresponds to an area having a success rate larger than a preset threshold. Reference numeral "1502" indicates a recognized area for the cascade type coil. As noted through FIG. 15A, the spatial area of the recognized area of the coil according to the embodiment of the present disclosure may be larger, which may mean that a coil recognizable range according to the present disclosure is relatively wide. For example, as shown in Table 3, the coil according to the embodiment of the present disclosure has the wider recognition success area even though inductances and resistances of the cascade type coil according to the embodiment of the present disclosure and the remaining coils have similar values, which may mean that the magnetic field additionally formed by the conductor, that is, the via set distributes to the recognition success. For example, it is noted that the recognition success rate relatively becomes higher in the center and, accordingly, a sufficient size magnetic field is formed in a null area.

In addition, FIG. 15B illustrates a recognition success rate of the coils in the two layered structure and the coils in the three layered structure according to the present disclosure. In FIG. 15B, an area indicated by reference numeral "1511" refers to a recognized area for the coils in the three layered structure according to an embodiment of the present disclosure and an area indicated by reference numeral "1512" refers to a recognized area for the coils in the two layered structure according to an embodiment of the present disclosure. As noted in FIG. 15B, the spatial area of the recognized area of the coils in the three layered structure may be larger, which may mean that a recognizable range of the coils in the three layered structure according to the present disclosure is relatively wider than that of the coils in the two layered structure. This may be associated with the coils in the three layered structure that have higher inductance than that of the coils in the two layered structure.

Table 4 below shows recognition success rates according to a distance between the electronic device and the POS terminal.

TABLE 4

| Coil type | Distance between electronic device and POS terminal is 1 cm | Distance between electronic device and POS terminal is 3 cm | Distance between electronic device and POS terminal is 5 cm |
|---|---|---|---|
| Cascade type coil in two layered structure | 58.73% | 58.20% | 38.10% |
| Cascade type coil in three layered structure | 63.49% | 60.32% | 43.39% |
| Spiral type coil in two layered structure (coil according to the embodiment of the present disclosure) | 51.85% | 52.91% | 34.92% |
| Spiral type coil in three layered structure (coil according to the embodiment of the present disclosure) | 53.97% | 55.03% | 37.57% |

As noted through Table 4 above, the coil according to the embodiment of the present disclosure has a higher recognition success rate than that of the coil according to the comparative example and, in particular, the coils in the three layered structure may have a higher recognition success rate than that of the coils in the two layered structure. For example, as shown in Table 3 above, the coil according to the embodiment of the present disclosure has the highest recognition success rate even though inductances of the coil according to the embodiment of the present disclosure and the cascade type coil have similar values, which may mean that the magnetic field additionally formed by the conductor, that is, the via set distributes to the recognition success.

Figure 16A:
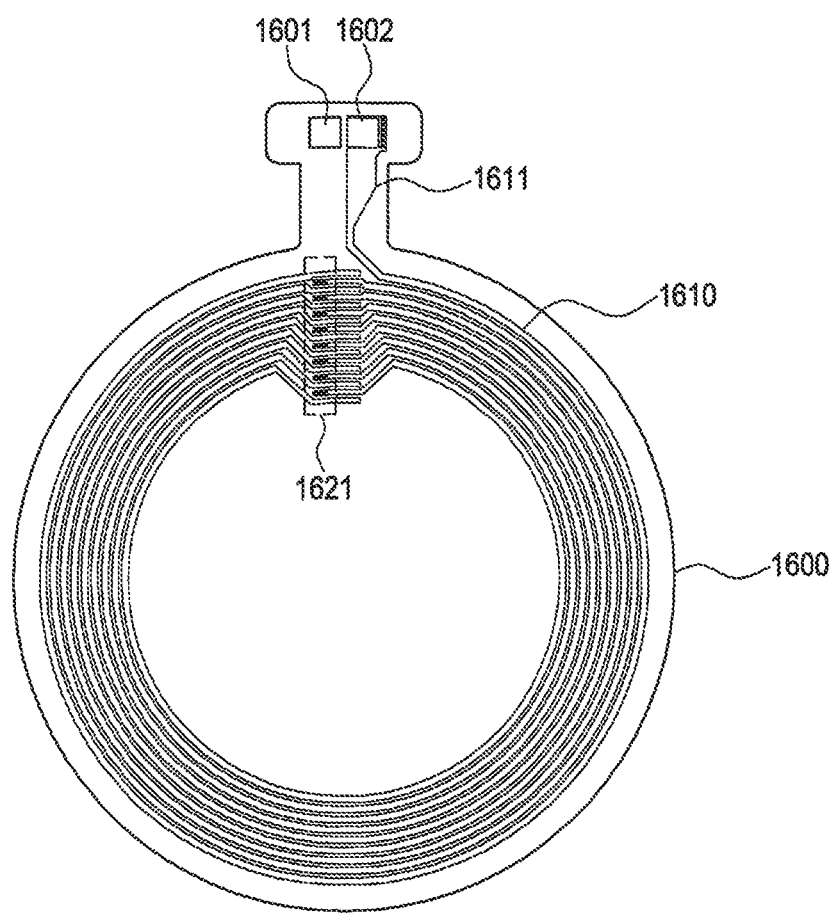
FIGS. 16A and 16B illustrate coils disposed on a wearable electronic device.
Figure 16B:
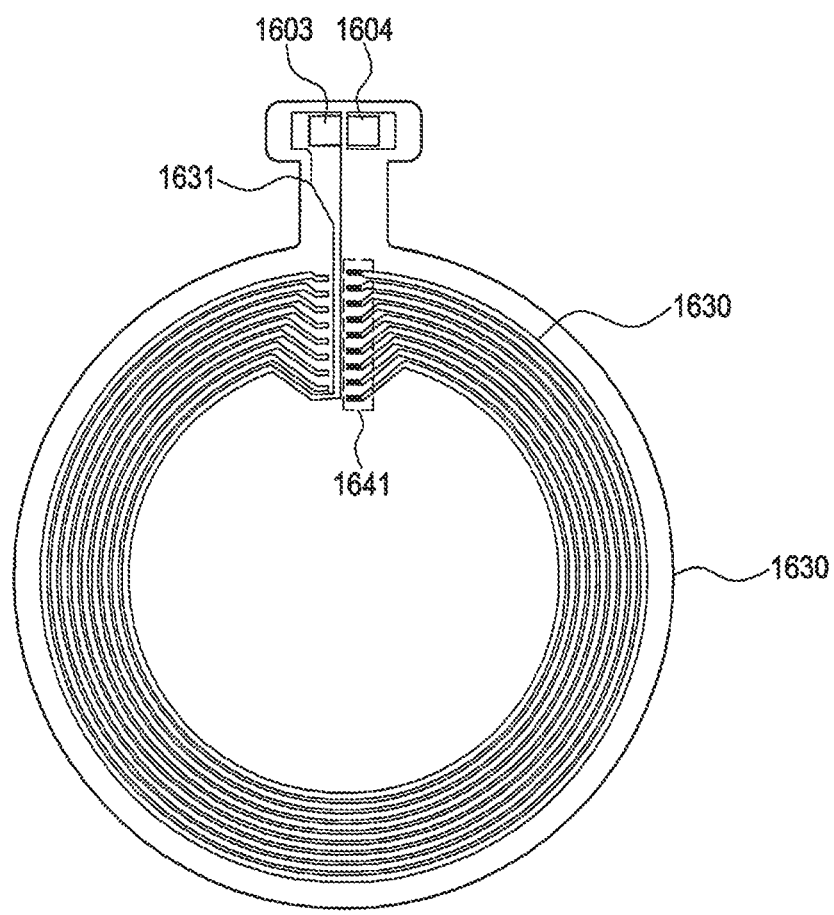

FIGS. 16A and 16B illustrate coils disposed on a wearable electronic device, for example, a wrist watch type wearable electronic device. The wrist watch type wearable electronic device may have, for example, a circular housing.

Referring to FIG. 16A, a first MST coil 1610 may be disposed on a first layer 1600. As illustrated in FIG. 16B, a second MST coil 1630 may be disposed on a second layer 1640. In addition, the first MST coil 1610 may be connected to the second MST coil 1630 through a first conductor 1621, that is, a via set, and the second MST coil 1630 may be also connected to the first MST coil 1610 through a second conductor 1641, that is, a via set. The first MST coil 1610 and the second MST coil 1630 may have a circular winding form. That is, the first MST coil 1610 and the second MST coil 1630 may have a winding form corresponding to the housing form In addition, the first MST coil 1610 may be connected to an input/output terminal 1602 through an input/output pattern 1611, and the second MST coil 1630 may be connected to an input/output terminal 1603 through an input/output pattern 1631. In addition, the first MST coil 1610 may have a closed loop form, and the second MST coil 1630 may have an opened loop form. Accordingly, an additional coil may be further disposed on the inner side of the first MST coil 1610 and the second MST coil 1630, and an input/output pattern for the additional coil may be disposed between a start point and an end point of each of the second MST coils 1630. In the embodiments of FIGS. 16A and 16B, a width of the winding pattern may be 0.4 mm and the number of turns on each layer may be 9. Accordingly, the total number of turns of coils may be 18. In addition, as described in connection with FIG. 5, the connection relation of coils may have the spiral form in which the end point of the coil on the first layer is connected to the start point of the coil on the second layer through the via set and the end of the coil on the second layer is connected to the start point of the next coil on the first layer through another via set.

Figure 17A:
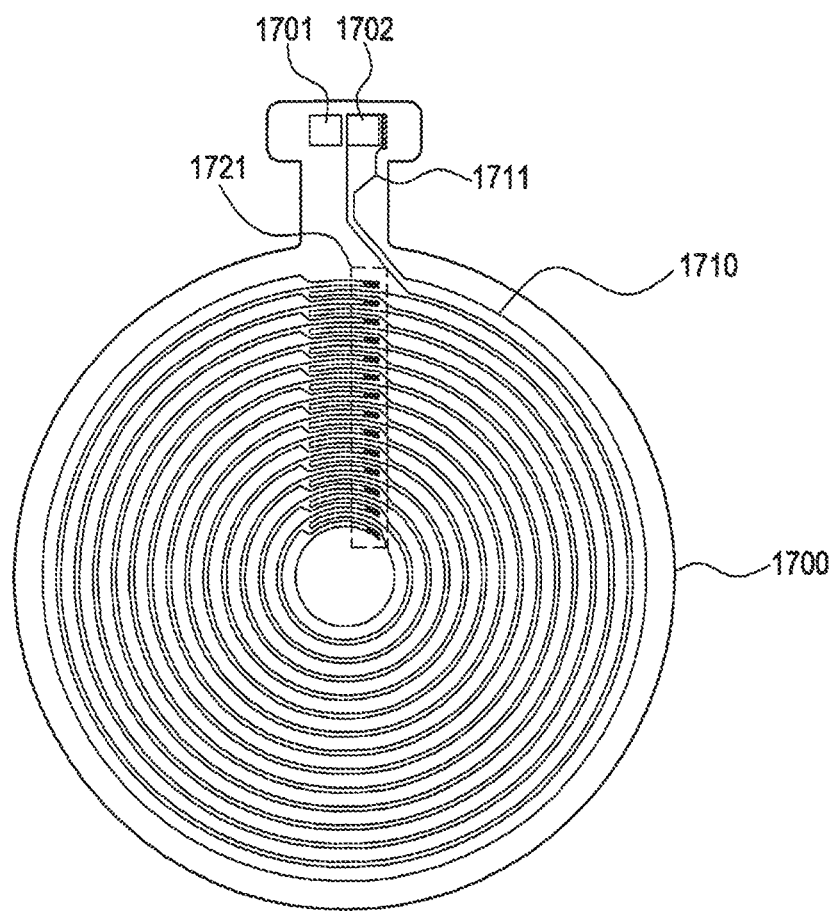
FIGS. 17A to 17C illustrate coils in a three layered structure according to various embodiments of the present disclosure.
Figure 17B:
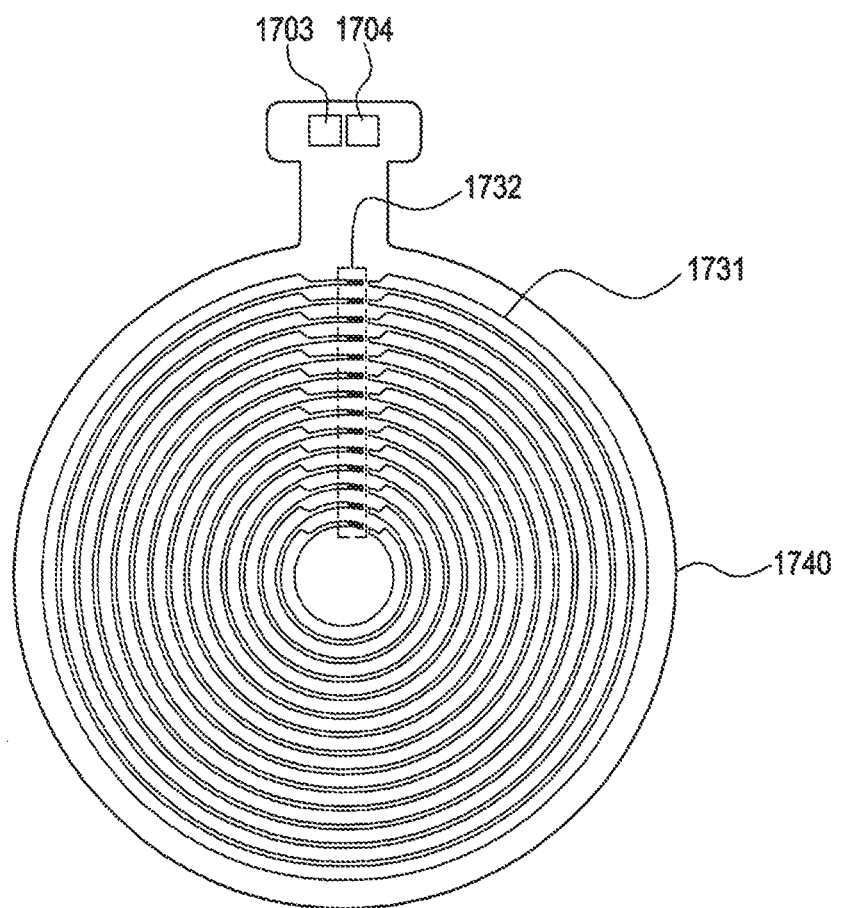
Figure 17C:
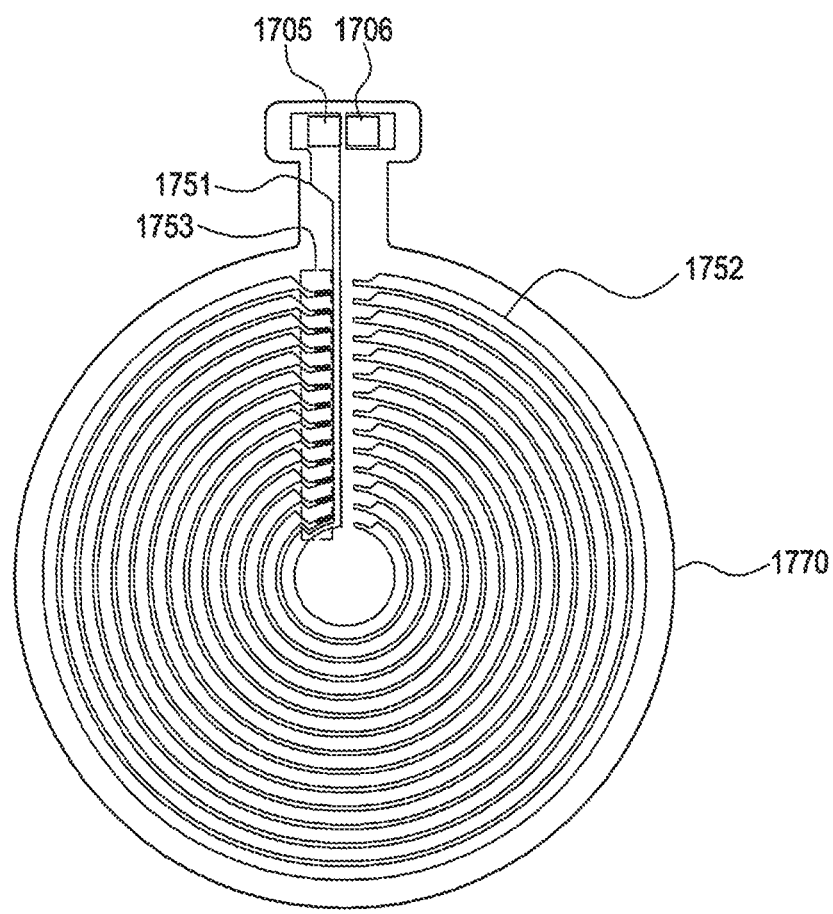

FIGS. 17A to 17C illustrate coils in a three layered structure according to various embodiments of the present disclosure.

Referring to FIG. 17A, a first MST coil 1710 may be disposed on a first layer 1700, a second MST coil 1731 may be disposed on a second layer 1740, and a third MST coil 1752 may be disposed on a third layer 1770. The first MST coil 1710 may be connected to an input/output terminal 1702 through an input/output pattern 1711, and the third MST coil 1752 may be connected to an input/output terminal 1705 through an input/output pattern 1751. The first MST coil 1710 may be connected to the second MST coil 1731 through a first conductor 1721, the second MST coil 1731 may be connected to the third MST coil 1752 through a second conductor 1732, and the third MST coil 1752 may be connected to the first MST coil 1710 through a third conductor 1753. In FIGS. 17A to 17C, a width of the winding pattern may be 0.8 mm and the number of turns on each layer may be 14. Accordingly, the total number of turns of coils may be 42. In addition, an FPCB on which the coils of FIGS. 17A to 17C are disposed may be implemented to have the same thickness as that of the FPCB on which the coils of FIGS. 16A and 16B are disposed. Since the width of the winding pattern is 0.8 mm, which is wider than that of FIGS. 16A and 16B, a resistance may remain in the similar value even though the whole coil becomes longer. That is, the coils of FIGS. 17A to 17C may have a relatively high inductance while having a similar resistance to that of the coils of FIGS. 16A and 16B.

Figure 18A:
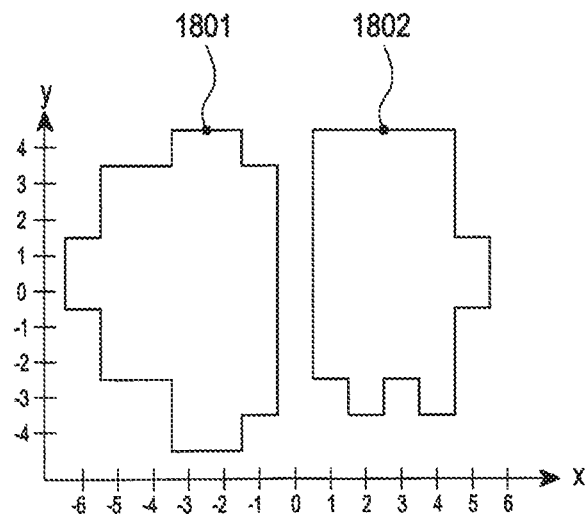
FIGS. 18A and 18B illustrate results of recognized area according to various embodiments.
Figure 18B:
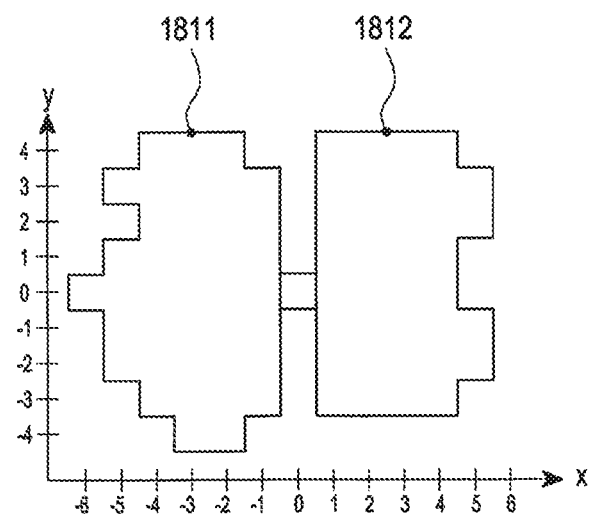

FIGS. 18A and 18B illustrate recognition success rates according to a location for a comparison between performances of circular coils in the two layered structure and circular coils in three layered structure according to various embodiments of the present disclosure. Table 5 below illustrates a comparison between electrical characteristics of the circular coils in the two layered structure and the circular coils in the three layered structure.

TABLE 5

| Coil type | Thickness (mm) | Inductance (uH) | Resistance (ohm) |
|---|---|---|---|
| Circular coils in two layered structure | 137.5 | 25.00 | 1.824 |
| Circular coils in three layered structure | 136.0 | 46.10 | 1.827 |

All materials of the coils in Table 5 above are the same and are disposed within the same space. As noted through FIG. 5, resistances of the two coils may have similar values. That is, even though the total length of circular coils in the three layered structure is relatively longer than the circular coils in the two layered structure, as a width is relatively larger, the resistance may remain in the similar value.

FIGS. 18A and 18B illustrate results of recognized area according to various embodiments. For example, areas indicated by reference numerals "1801" and "1802" of FIG. 18A may refer to recognized areas according to the circular coils in the two layered structure, which correspond to areas having a success rate larger than a preset threshold. Reference numerals "1811" and "1812" indicate recognized areas for the circular coils in the three layered structure. As noted through FIG. 18B, the spatial area of the circular coils in the three layered structure according to the embodiment of the present disclosure may be larger, which may mean that a coil recognizable range according to the present disclosure is relatively wide. In particular, it is noted that the recognition success rate relatively becomes higher in the center and, accordingly, a sufficient size magnetic field is formed in a null area. Further, an effect of the magnetic field by the conductor, that is, the via set can be identified in that the recognition success rate in left and right areas of the center is higher in FIGS. 18A and 18B.

Table 6 below shows recognition success rates according to a distance between the electronic device and the POS terminal.

TABLE 6

| Coil type | Distance between electronic device and POS terminal is 1 cm | Distance between electronic device and POS terminal is 3 cm | Distance between electronic device and POS terminal is 5 cm |
|---|---|---|---|
| Circular coils in two layered structure | 56.41% | 60.68% | 26.50% |
| Circular coils in three layered structure | 58.12% | 64.96% | 34.19% |

As noted through Table 6, the recognition success rate larger than 60% can be acquired even in the distance of 3 cm, which is a recommended MST distance, and good transmission/reception of the MST signal can be guaranteed even in a small electronic device such as a wearable electronic device.

Figure 19:
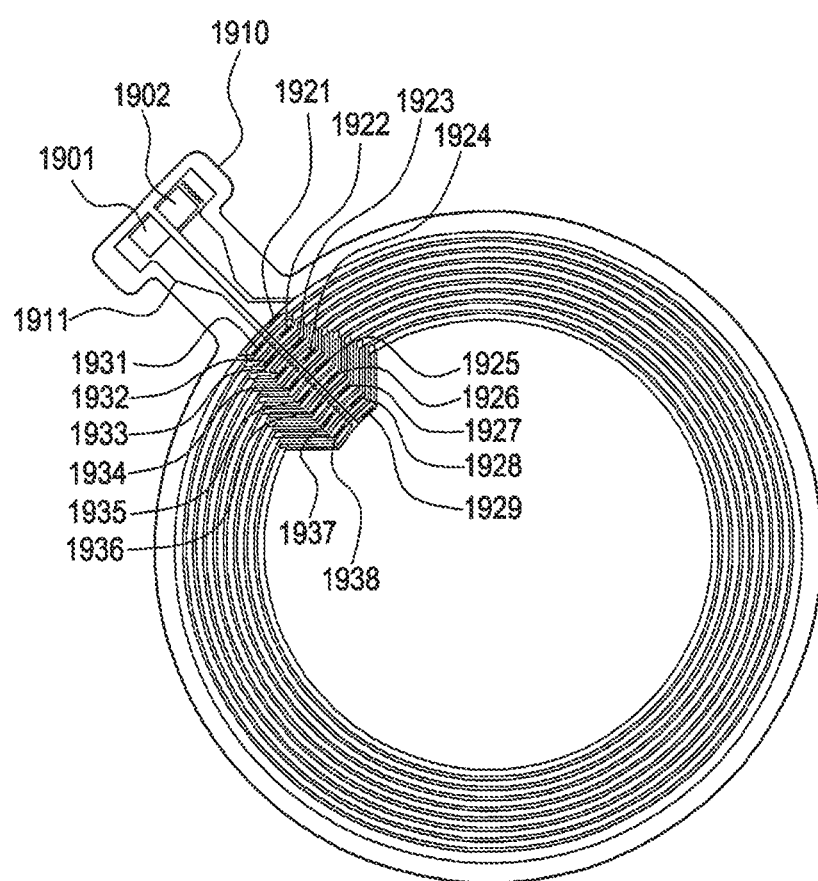
FIGS. 19 and 20 illustrate circular coils in various two layered and three layered structures according to various embodiments of the present disclosure.
Figure 20:
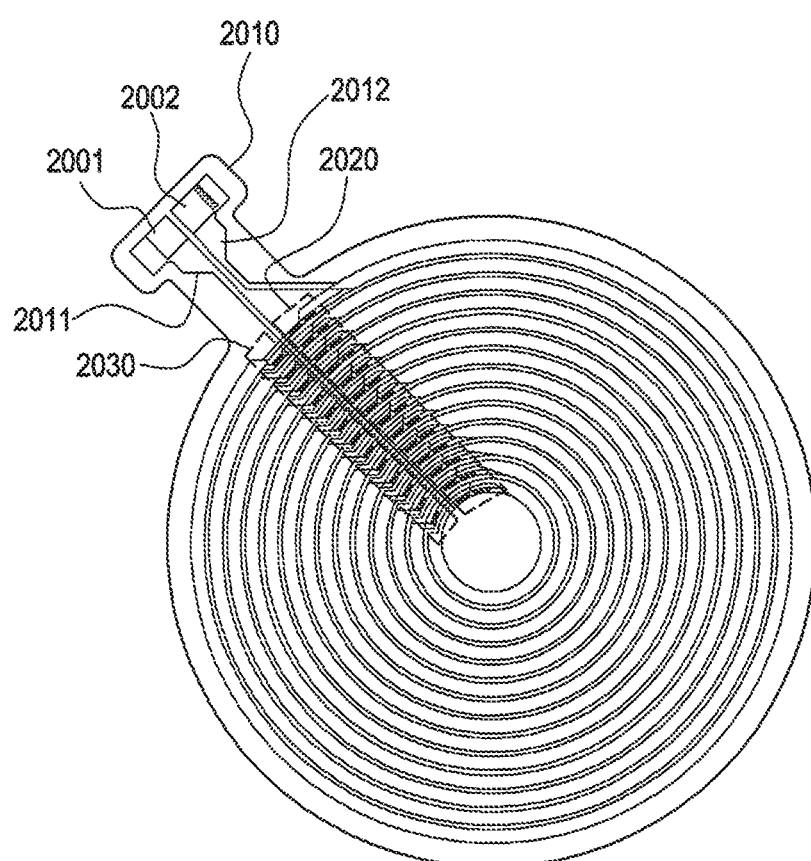

FIGS. 19 and 20 illustrate circular coils in various two layered and three layered structures according to the present disclosure. The circular coils of FIGS. 19 and 20 may be disposed in a particular direction based on the housing.

Referring to FIG. 19, it is noted that input/output terminals 1901 and 1902 and input/output patterns 1911 and 1912 lean to a particular direction. Accordingly, first via sets 1921 to 1929 to which the current is applied in a first direction, and second via sets 1931 to 1939 to which the current is applied in a second direction may also lean in a particular direction. Directions of magnetic fields formed by the first via sets 1921 to 1929 and the second via sets 1931 to 1939 may also head in a particular direction. Accordingly, the circular coils may be designed to be arranged in at a particular direction to allow the magnetic fields formed by the via sets to direct at the POS terminal according to a way in which the user makes the wearable electronic device approach the POS terminal while wearing the wearable electronic device.

Referring to FIG. 20, input/output terminals 2001 and 2002 and input/output patterns 2011 and 2012 lean to a particular direction in the coils in the three layered structure. Further, via sets 2020 to which the current is applied in a first direction and via sets 2030 to which the current is applied in a second direction may also direct at a particular direction. Accordingly, induced magnetic fields formed by the via sets 2020 and 2030 may also head in a particular direction.

As illustrated in FIGS. 19 and 20, the coils according to various embodiments of the present disclosure may form not only the magnetic field by the circular coils but also the magnetic field by the conductor, that is, the via set disposed in a direction perpendicular to the circular coils, and also control a directed direction of the formed magnetic field by controlling a location of the via set.

Figure 21:
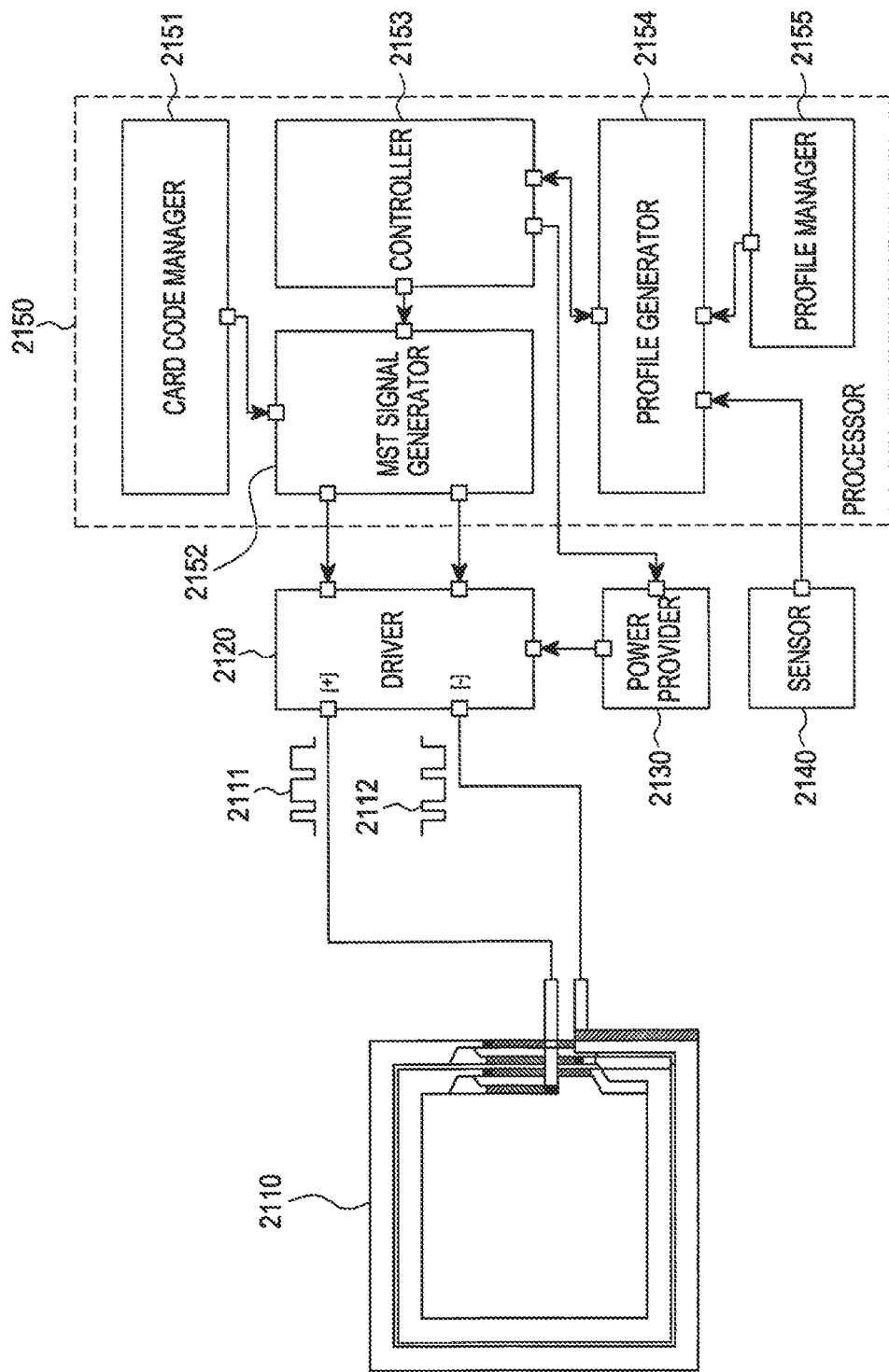
FIG. 21 is a block diagram of an electronic device according to various embodiments of the present disclosure.

FIG. 21 is a block diagram of an electronic device according to various embodiments of the present disclosure.

As illustrated in FIG. 21, the electronic device may include coils disposed on a plurality of layers, for example, a coil 2110 by FIG. 5. In the embodiment of FIG. 21, the coil 2110 is used as the MST coil. The coil 2110 may be connected to a driver 2120. The driver 2120 may include a charge pump circuit and an over current protection (OCP) circuit. The charge pump circuit cannot produce power by itself, but may receive power from another power provider 2130. The power providing circuit unit 2130 may include a power switch circuit for preventing direct connection to a battery and may be enabled by a controller 2153. The driver 2120 may receive the current from the power provider 2130, receive MST data from a processor 2150, for example, an MST data generator 2152 and then may be automatically enabled. The driver 2120 may generally have one input and output terminal, which may be divided into two input and output terminals by an internal logic of the driver 2120. The driver 2120 may apply input/output signals 2111 and 2112, that is the current to the coil 2110, and the coil 2110 may induce an induced magnetic field according to the applied current. The driver 2120 may be a circuit which can generate an output current based on amplification of MST data and an input pulse signal.

A card code manager 2151 may be a logic part for encrypting and managing card information registered by the user. The MST data generator 2152 may be a logic part for receiving card encryption information from the card code manager 2151 and generating a signal for payment based on the card encryption information. A profile identifier 2154 may be a logic part for performing authentication processing on user input information based on a user profile. A profile manager 2155 may be a logic part for generating a profile and managing a pre-stored user profile. A sensor 2140 may be a circuit for acquiring user biometric information such as a fingerprint, HRM, touch, and image. More specifically, the sensor 2140 is a circuit for acquiring user approval information required during a payment process, and may be implemented in various forms such as an image acquisition circuit for acquiring an image for face recognition, finger recognition, and iris recognition, a touch screen for recognizing a finger, ear shape, and hand pattern, electrodes for ECG recognition and HRM recognition, and a microphone for voice recognition.

When a payment application is executed, the electronic device may acquire card information form the card code manager 2151. The electronic device may acquire user biometric information from the sensor 2140. The profile identifier 2154 may perform user authentication by using the user biometric information and the card information. When the user is authenticated, the MST signal generator 2152 may generate an MST signal. The driver 2120 and the power provider 2130 may transmit the generated MST signal to the coil 2110. The coil 2110 may induce the induced magnetic field in accordance with the received MST signal. The MST signal may be a signal changing according to time and, accordingly, a strength of the induced magnetic field induced from the coil 2110 may also change according to time. The POS terminal may recognize the induced magnetic field having the strength changing according to time and, accordingly, perform payment or relay payment information to the server. In this document, the MST signal may be also named a magnetic signal and, in this case, the MST signal generator 2152 may be named a magnetic signal generating circuit.

Figure 22:
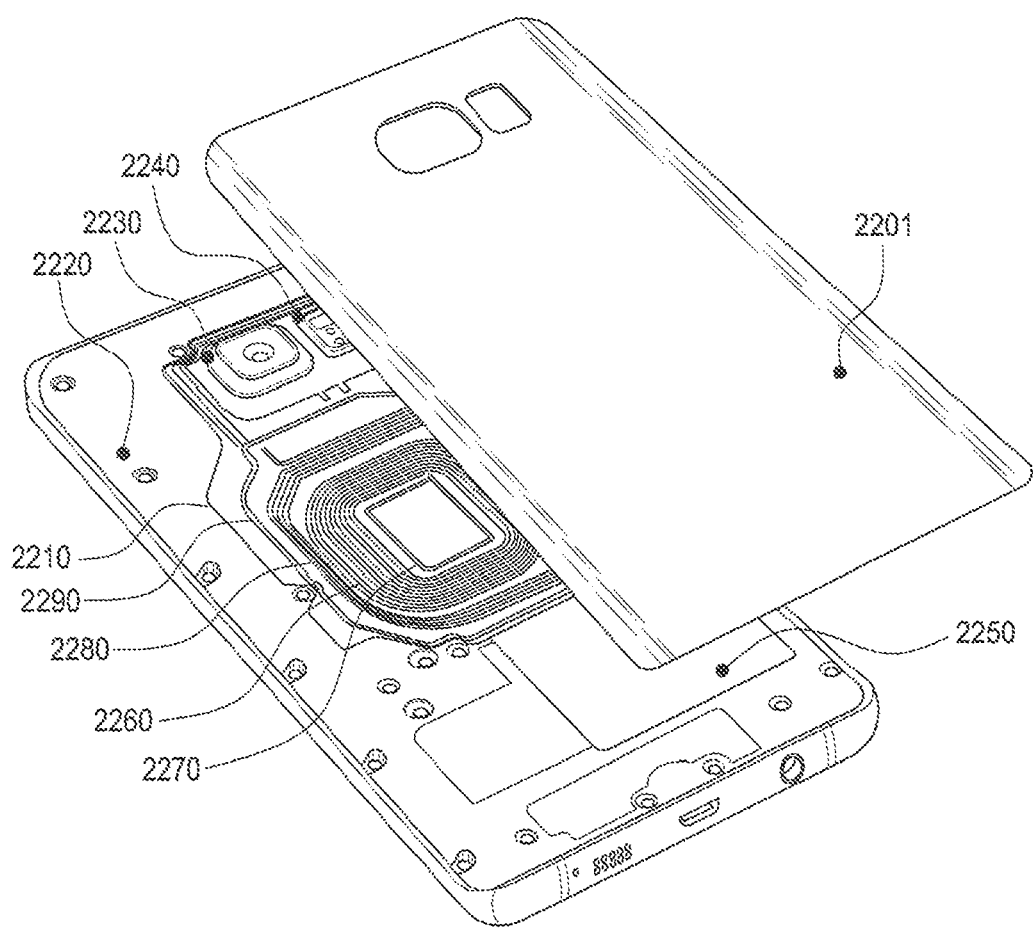
FIG. 22 is a rear perspective view of an electronic device when a case of the electronic device is opened according to various embodiments of the present disclosure.

FIG. 22 is a rear perspective view illustrating the electronic device when a case 2201 of the electronic device is opened according to various embodiments of the present disclosure.

A housing 2220 may be disposed on the rear surface of the electronic device. A first NFC coil 2270 may be disposed at the center of the housing 2220, and a wireless charging coil 2260 may be disposed on the outer side of the first NFC coil 2270. An MST coil 2280 may be disposed on the outer side of the wireless charging coil 2260. A second NFC coil 2290 may be disposed on the outer side of the MST coil 2280. A dummy pattern 2210 may be disposed on the outer side of the second NFC coil 2290. In addition, although coils on the rear surface are illustrated as being disposed on a single layer, the coils may be implemented in a structure including a multi-layer structure and conductors in a vertical direction, for example, the structure of FIG. 5. A battery 2250 may be disposed below the second NFC coil 2290. The housing 2220 may be cut off at the part where the battery 2250 is disposed. A camera 2230 and a sensor 2240 may be disposed above the second NFC coil 2290. An FPCB on which the MST coil 2280 is disposed may adhere to the housing 2220 or the battery 2250. In order to avoid overlapping between the FPCB and elements such as the camera 2230 and the sensor 2240, a coil pattern may be implemented by a bypass design. Another member may be adhered to at least one of the upper surface and the lower surface of the FPCB. For example, a heat radiating material (for example, a graphite sheet) for preventing thermal diffusion or a shielding material (for example, a shielding sheet) for preventing another element from being damaged by a strong induced magnetic field may be adhered to at least one of the upper surface and the lower surface of the FPCB. A protection film for preventing damage of the FPCB may be adhered to at least one of the upper surface and the lower surface of the FPCB.

Figure 23:
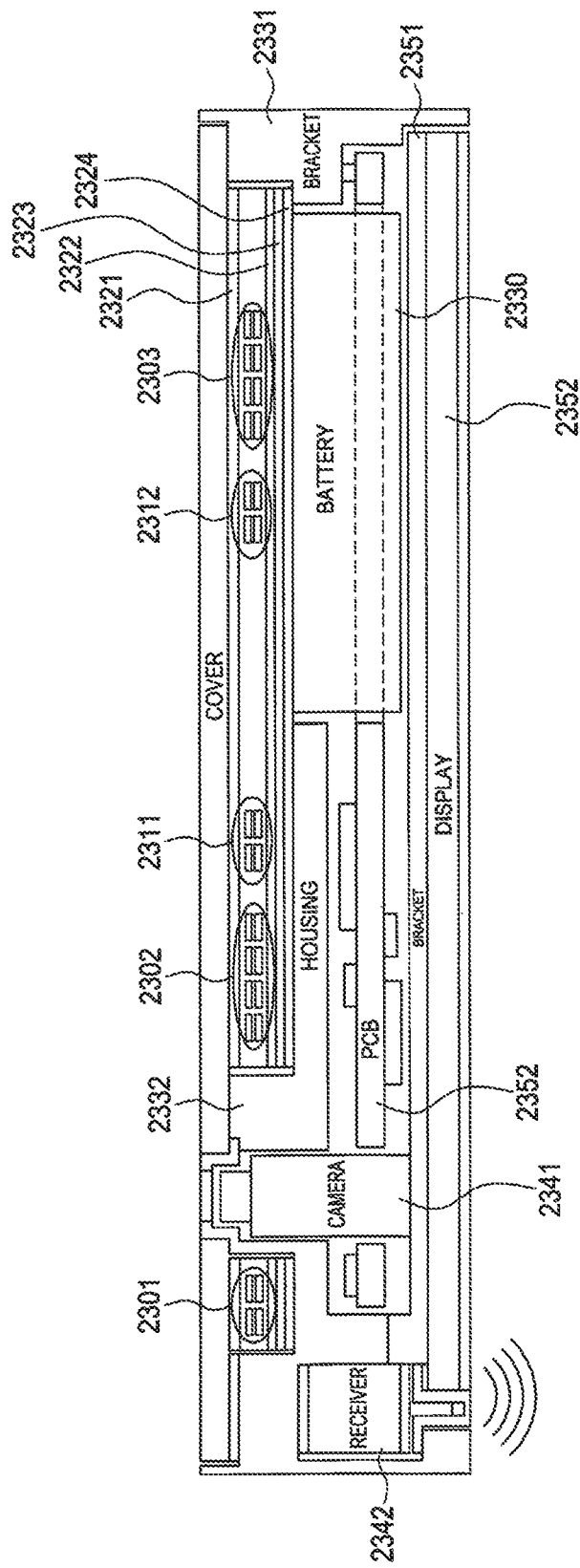
FIG. 23 is a cross-sectional view of an electronic device according to various embodiments of the present disclosure.

FIG. 23 is a cross-sectional view illustrating an electronic device according to various embodiments of the present disclosure.

Referring to FIG. 23, a display 2352 may be disposed relatively on the lower side of the electronic device. A bracket 2351 may be disposed above the display 2352 and a camera 2341 may be displayed on the bracket 2351. In addition, a receiver 2342 may be disposed beside the display 2352 and the bracket 2351. A PCB 2352 on which a plurality of devices are mounted and a battery 2330 may be disposed above the bracket 2351. A housing 2331 may be disposed above the PCB 2352. Coils 2302, 2311, 2312, and 2303 may be disposed above the housing 2331 and the battery 2330. For example, the coils 2302 and 2303 may be MST coils, and the coils 2311 and 2312 may be wireless charging coils. As illustrated in FIG. 23, the coils 2302, 2311, 2312, and 2303 may have a structure of multiple layers, and a conductor for connecting layers, that is, a via set, which is not illustrated, may be disposed. In addition, the electronic device may further include an additional pattern 2301 for securing an additional magnetic field strength. A protection film 2321 may be disposed on the coils 2302, 2311, 2312, and 2303, and a cover (for example, glass) may be disposed on the protection film 2321. In addition, an adhesive layer 2324, a graphite sheet 2323, and a protection sheet 2322 may be disposed between the battery 2330 and the coils 2302, 2311, 2312, and 2303. A bracket 2331 may be disposed beside the electronic device and protect internal devices.

FIG. 24 illustrates laminated structures of FPCBs on which coils in a two layered structure and coils in a three layered structure are disposed according to various embodiments of the present disclosure.

Referring to FIG. 24A, in the coils in the two layered structure, a substrate (base) includes a polyimide film (PI) and copper layers (Cu) disposed on both sides of the polyimide film (PI). According to an embodiment, a thickness of the polyimide film (PI) may be 12.5 mm, and a thickness of each of the copper layers (Cu) may be 35 mm. Plating layers (plating) may be disposed on both sides of the substrate (base) and may include, for example, copper plating layers (Cu-plating). The plating layer (plating) may have a thickness, for example, 10 mm. Cover films (covery) may be disposed above the upper plating layer (plating) and below the lower plating layer (plating). The cover film (covery) may include an adhesive layer (adhesive) for adhesion with the plating layer (plating) and a polyimide film (PI). For example, the adhesive layer (adhesive) may have a thickness of 5 mm, and the polyimide film (PI) may have a thickness of 5 mm. In addition, not illustrated, a conductor, that is, a via set for connecting the copper layers (Cu) in a vertical direction may be formed, and the via set may connect the copper layers (Cu) through an opening formed on the polyimide film (PI) disposed between the copper layers (Cu).

Referring to FIG. 24B, a substrate (base) including two copper layers (Cu) and a substrate (base) including one copper layer (Cu) may be disposed on the FPCB including coils in the three layered structure. For example, one substrate (base) may include a polyimide film (PI) and two copper layers (Cu) disposed on both sides of the polyimide film (PI). The other substrate (base) may include a polyimide film (PI) and a copper layer (Cu) disposed below the polyimide film (PI). The copper layers (Cu) may have a thickness of 18 mm each, and the polyimide film (PI) may have a thickness of 12.5 mm. In addition, an adhesive layer (bonds or adhesive) may be disposed between the two substrates (base) to connect them and may have a thickness of, for example, 13 mm. In addition, a plating layer (plating) may be disposed above the copper layer (Cu) of one substrate (base), and the plating layer (plating) may include, for example, a copper plating layer (Cu-plating). The plating layer (plating) may have a thickness of, for example, 10 mm. Further, the plating layer (plating) may be disposed below the copper layer (Cu) of the other substrate (base), and the plating layer (plating) may include, for example, a copper plating layer (Cu-plating). Cover films (covery) may be disposed above the upper plating layer (plating) and below the lower plating layer (plating). The cover film (covery) may include an adhesive layer (adhesive) for adhesion with the plating layer (plating) and a polyimide film (PI). For example, the adhesive layer (adhesive) may have a thickness of 5 mm, and the polyimide film (PI) may have a thickness of 5 mm.

Figure 25:
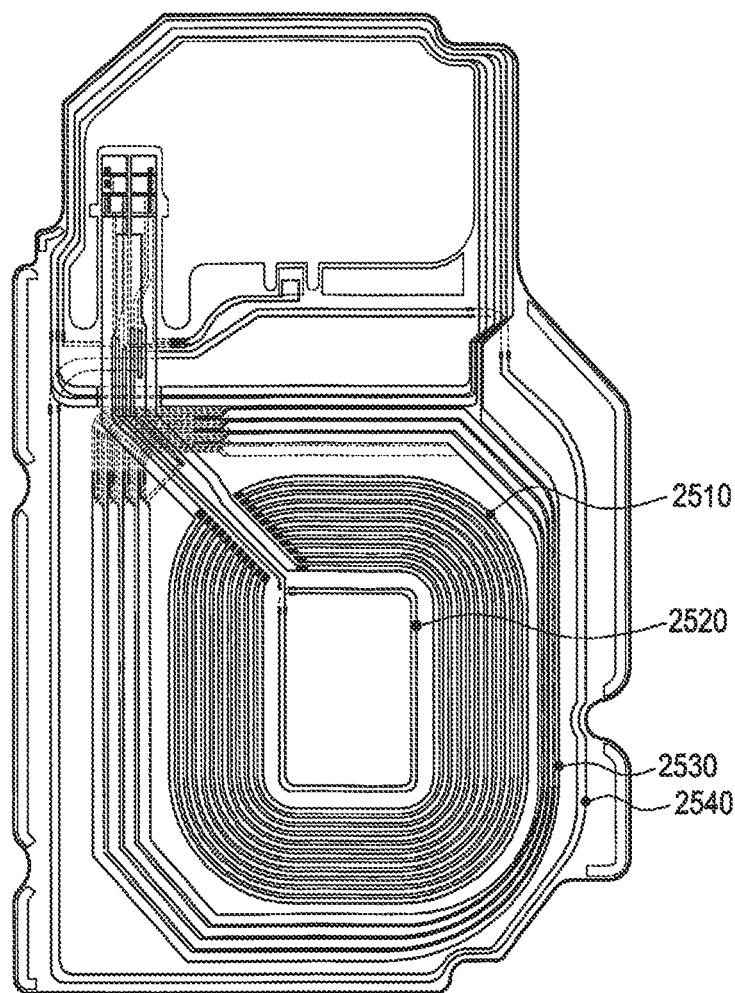
FIG. 25 is a plan view illustrating a coil pattern according to various embodiments of the present disclosure.

FIG. 25 is a plan view illustrating a coil pattern according to various embodiments of the present disclosure.

Referring to FIG. 25, the electronic device according to the present disclosure may include an MST coil 2530. An NFC coil 2540 may be disposed on the outer side of the MST coil 2530, and a wireless charging coil 2510 may be disposed on the inner side of the MST coil 2530. In addition, a magnetic field strength may be relatively weak at the center of the MST coil 2530 and, in this case, a null area may be generated. Accordingly, the electronic device according to various embodiments of the present disclosure may further include an additional MST coil 2520 disposed on the inner side of the wireless charging coil 2510 to compensate for the null area. The generation of the null area may be prevented by the magnetic field of the additional MST coil 2520.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application specific integrated circuit (ASIC) chip, a field programmable gate array (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130.

The computer readable recoding medium may include a hard disk, a floppy disk, magnetic media (e.g., a magnetic tape), optical media (e.g., a compact disk ROM (CD-ROM) and a DVD), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Various embodiments disclosed herein are provided merely to easily describe technical details of the present disclosure and to help the understanding of the present disclosure, and are not intended to limit the scope of the present disclosure. Therefore, it is intended that all modifications and changes or modified and changed forms based on the present disclosure fall within the scope of the present disclosure as defined by the appended claims and their equivalents.

What is claimed is:

1. An electronic device, comprising:
 a cover forming at least a portion of a first face of the electronic device;
 a display disposed on a second face of the electronic device opposite to the first face;
 a touch panel coupled to the display;
 a battery disposed between the display and the cover;
 a printed circuit board (PCB) disposed between the display and the cover;
 a flexible printed circuit board (FPCB) having at least two layers, wherein at least a portion of the flexible printed circuit board is disposed between at least a portion of the battery and the cover, and at least another portion of the flexible printed circuit board is disposed between at least a portion of the printed circuit board and the cover; and
 a processor electrically coupled to the flexible printed circuit board,
 wherein the flexible printed circuit board comprises:
  a first coil comprising a plurality of turns and supporting a near field communication (NFC);
  a second coil including a plurality of turns forming a loop surrounding the first coil, and supporting a transmission mode different from the near field communication; and
  a first supply wiring electrically connected to the second coil and the processor,
 wherein the second coil includes a first portion disposed on a first layer of the flexible printed circuit board, and a second portion disposed on a second layer of the flexible printed circuit board and electrically connected to the first portion through a first plurality of via holes passing through an insulating layer disposed between the first layer and the second layer,
 wherein the first supply wiring is disposed on the second layer of the flexible printed circuit board, is electrically connected to the first portion at inside of the loop through a second plurality of via holes, and, is extend from the inside of the loop to outside, and
 wherein the processor is configured to:
  supply, by using the first supply wiring, a current to the second coil, and
  transmit, by using the second coil, a magnetic signal corresponding to a payment data, to outside the electronic device.

2. The electronic device of claim 1, wherein the electronic device further comprises a second supply wiring electrically connected to the second coil and the processor, and
 wherein the second supply wiring is disposed on the second layer of the flexible printed circuit board, and electrically connected to one of the second coil.

3. The electronic device of claim 1, wherein the transmitted magnetic signal is changed in size according to time, and corresponds to a magnetic signal which is generated when a magnetic credit card is swiped to a card reader.

4. The electronic device of claim 1, wherein the second coil is wound 10 times.

5. The electronic device of claim 1, wherein at least a portion of the first portion of the second coil is disposed to overlap at least a portion of the second portion in a direction perpendicular to the first surface.

6. The electronic device of claim 5, wherein a position where the at least a portion of the first portion overlaps the at least a portion of the second portion in the direction perpendicular to the first surface comprises:
a first position where the second portion is electrically connected to the first portion via the first plurality of via holes, and
a second position different from the first position.

7. The electronic device of claim 1, wherein the first portion or the second portion comprises a first part having a first width and a second part having a second width that is narrower than the first width.

8. The electronic device of claim 1, wherein the battery does not overlap to the printed circuit board in the direction perpendicular to the first surface, and
wherein the first portion or the second portion comprises at least portion which overlaps the battery in the direction perpendicular to the first surface, and another portion which overlaps the printed circuit board in the direction perpendicular to the first surface.

9. The electronic device of claim 1, wherein the electronic device further comprises a shielding layer disposed at least partially between the flexible printed circuit board and the battery.

10. The electronic device of claim 1, wherein the electronic device further comprises a graphite layer disposed at least partially between the flexible printed circuit board and the battery.

11. The electronic device of claim 1, wherein the electronic device further comprises a protection layer disposed at least partially between the flexible printed circuit board and the battery, or between the cover and the flexible printed circuit board.

12. The electronic device of claim 1, wherein the cover is formed of a glass.

13. The electronic device of claim 1, wherein the electronic device further comprises a supporting member disposed between the display and the battery.

14. The electronic device of claim 1, wherein at least one of the first coil or the second coil at least partially comprises copper (CU).

15. The electronic device of claim 1, wherein an insulating layer disposed between the first layer and the second layer of the flexible printed circuit board comprises a polymer layer, and
wherein the first plurality of via holes and the second plurality of via holes penetrate the polymer layer.

16. The electronic device of claim 1, wherein the flexible printed circuit board further comprises:
a first insulating layer covering the first portion; and
a second insulating layer covering the second portion.

17. The electronic device of claim 16, wherein the first insulating layer or the second insulating layer at least partially comprise a polyimide.

18. The electronic device of claim 16, wherein the flexible printed circuit board further comprises:
a first adhesive layer disposed between the first portion and the first insulting layer; and
a second adhesive layer disposed between the second portion and the second insulating layer.

19. The electronic device of claim 1, wherein the processor is electrically connected to the display, and is configured to display, on at least portion of the display, image associated with the magnetic credit card corresponding to the payment data.

20. The electronic device of claim 1, wherein the processor is electrically connected to the display, and is configured to display, on at least portion of the display, image indicating that a payment associated with the payment data is in progress.

21. The electronic device of claim 1, wherein the electronic device further comprises a fingerprint sensor electrically connected to the processor, and
wherein the processor is configured to:
acquire a fingerprint information of a user by using the fingerprint sensor,
perform a user authentication based on the acquired fingerprint information,
transmits the magnetic signal based on the user authentication.

22. The electronic device of claim 1, wherein the first portion is disposed on a first face of the insulating layer, and
wherein the second portion is disposed on a second face of the insulating facing opposite to the first face of the insulating layer.

23. The electronic device of claim 1, wherein a first part of the first portion which is connected to the first supply wiring through the second plurality of via holes has a first width, and
wherein a second part of the first portion which is extended from the first part has a second width wider than the first width.

24. The electronic device of claim 1, wherein the first coil comprises a third portion which is disposed on the first layer of the flexible printed circuit board, and a fourth portion which is disposed on the second layer of the flexible printed circuit board,
wherein at least portion of the fourth portion is connected to the third portion through a third plurality of via holes penetrating the insulating layer disposed between the first layer and the second layer.

25. The electronic device of claim 24, wherein the first portion is disposed outside the third portion, at the first layer, and
wherein the second portion is disposed outside the fourth portion, at the second layer.

* * * * *